United States Patent
Li et al.

(10) Patent No.: US 8,538,029 B2
(45) Date of Patent: Sep. 17, 2013

(54) ENCRYPTION KEY FRAGMENT DISTRIBUTION

(75) Inventors: Jun Li, Mountain View, CA (US); Sharad Singhal, Belmont, CA (US); Ram Swaminathan, Cupertino, CA (US); Bryan Stephenson, Alviso, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 144 days.

(21) Appl. No.: 13/071,459

(22) Filed: Mar. 24, 2011

(65) Prior Publication Data

US 2012/0243687 A1   Sep. 27, 2012

(51) Int. Cl.
    *H04L 9/08* (2006.01)
(52) U.S. Cl.
    USPC ............................. 380/279; 380/286
(58) Field of Classification Search
    USPC ................. 380/277–286; 713/150, 168, 171, 713/193
    See application file for complete search history.

(56) References Cited

U.S. PATENT DOCUMENTS

| | | | | |
|---|---|---|---|---|
| 5,530,757 A * | 6/1996 | Krawczyk | ...................... | 713/188 |
| 5,666,414 A * | 9/1997 | Micali | ............................ | 380/286 |
| 5,764,767 A * | 6/1998 | Beimel et al. | ................. | 713/180 |
| 5,991,414 A * | 11/1999 | Garay et al. | ................... | 713/165 |
| 6,182,214 B1 | 1/2001 | Hardjono | | |
| 6,396,929 B1 * | 5/2002 | Chandersekaran et al. | .. | 380/286 |
| 6,636,968 B1 * | 10/2003 | Rosner et al. | ................. | 713/178 |
| 7,080,259 B1 | 7/2006 | Nakanishi et al. | | |
| 7,421,082 B2 | 9/2008 | Kamiya et al. | | |
| 2001/0044879 A1 * | 11/2001 | Moulton et al. | .............. | 711/114 |
| 2002/0013898 A1 * | 1/2002 | Sudia et al. | .................... | 713/155 |
| 2002/0164033 A1 * | 11/2002 | Rajasekaran | ................. | 380/278 |
| 2003/0026432 A1 * | 2/2003 | Woodward | .................... | 380/278 |
| 2003/0061501 A1 | 3/2003 | Yamada | | |
| 2003/0147535 A1 * | 8/2003 | Nadooshan et al. | .......... | 380/277 |
| 2004/0064729 A1 * | 4/2004 | Yellepeddy | .................... | 713/201 |
| 2005/0053045 A1 * | 3/2005 | Chmora et al. | ............... | 370/338 |
| 2005/0138374 A1 * | 6/2005 | Zheng et al. | .................. | 713/166 |
| 2006/0072744 A1 * | 4/2006 | Ogihara et al. | ................. | 380/28 |
| 2007/0177739 A1 * | 8/2007 | Ganguly et al. | .............. | 380/277 |

(Continued)

FOREIGN PATENT DOCUMENTS

JP   2009218751 A   9/2009
WO  WO2012023929 A1   2/2012

OTHER PUBLICATIONS

A. Shamir, "How to share a secret," Communications of the ACM, v.22, n. 11, p. 612-613, Nov. 1979.

(Continued)

*Primary Examiner* — Darren B Schwartz

(57) ABSTRACT

An encryption key may be fragmented into n encryption key fragments such that k<n fragments are sufficient for reconstructing the encryption key. The encryption key fragments may be distributed across data stores located within first and second geographic regions. For example, at least k of the encryption key fragments may be distributed across data stores realized at N different availability zones within the first geographic region such that less than k of the encryption key fragments are distributed to each of the N availability zones within the first geographic region. Similarly, at least k of the encryption key fragments may be distributed across data stores realized at M different availability zones within the second geographic region such that less than k of the encryption key fragments are distributed to each of the M availability zones within the second geographic region.

15 Claims, 11 Drawing Sheets

(56) References Cited

U.S. PATENT DOCUMENTS

| | | | |
|---|---|---|---|
| 2007/0234102 A1* | 10/2007 | Fan et al. ........................... | 714/4 |
| 2008/0137868 A1* | 6/2008 | Sanders et al. ................. | 380/278 |
| 2009/0323970 A1* | 12/2009 | Cerruti et al. ................. | 380/281 |
| 2010/0020968 A1 | 1/2010 | Jin et al. | |
| 2010/0054458 A1* | 3/2010 | Schneider ........................ | 380/28 |
| 2010/0054481 A1* | 3/2010 | Jajodia et al. ................. | 380/284 |
| 2010/0172501 A1 | 7/2010 | Tian et al. | |
| 2010/0199123 A1* | 8/2010 | Cohen ............................... | 714/4 |
| 2010/0235638 A1* | 9/2010 | Irvine ........................... | 713/168 |
| 2011/0029809 A1* | 2/2011 | Dhuse et al. ...................... | 714/6 |
| 2011/0055662 A1* | 3/2011 | Grube et al. ................... | 714/763 |

OTHER PUBLICATIONS

Amazon.com, http://docs.amazonwebservices.com/ElasticLoadBalancing/latest/DeveloperGuide/index.html?CHAP__Glossary.html, Retrieved Mar. 24, 2011.

Geambasu, et al; "Vanish: Increasing Data Privacy with Self-Destructing Data," Proceedings of the USENIX Security Symposium, Montreal, Canada, 2009.

HP ESKM, http://h20338.www2.hp.com/NonStopComputing/us/en/atallasecurity/software/enterprise-secure-key-manager.html; Retrieved Mar. 24, 2011.

Right Scale, http://blog.rightscale.com/2008/03/26/setting-up-a-fault-tolerant-site-using-amazonsavailability-zones/; Mar. 26, 2008.

Deng, et al, "Threshold and Identity-based Key Management and Authentication for Wireless Ad Hoc Networks", Info. Tech.: Coding and Computing, 2004. Proceedings. ITCC, 2004.

Kussmaul, Michael, "A Distributed Low-Level Data Structure for Composing Scalable Concurrent Web Services", Master Thesis in Computer Science, Nov. 17, 2004.

Ueno, et al, "Disaster Recovery Mechanism using Widely Distributed Networking and Secure Metadata Handling Technology", High Performance Distributed Computing; Proceedings of the 4th edition of the UPGRADE-CN workshop on Use of P2P, GRID and agents for the development of content networks, Jun. 9, 2009.

* cited by examiner ary information for each of the multiple different
ENCRYPTION KEY FRAGMENT DISTRIBUTION

FIELD

This disclosure is related to encryption key fragment distribution.

BACKGROUND

Many on-line applications and services store and/or require access to sensitive data such as, for example, medical records and credit card information. In order to keep such sensitive data secure, on-line applications and services often store such sensitive data in an encrypted format.

Cryptographic algorithms may use encryption keys to encrypt data. Specifically, an encryption key may determine the functional output of a cryptographic algorithm. As such, an encryption key may be used to transform a piece of data from an unencrypted format into an encrypted format. Likewise, an encryption key may be used to transform a piece of data from its encrypted format back to its unencrypted format.

DETAILED DESCRIPTION

When encryption keys are used to encrypt data objects, encryption key management techniques may be employed to maintain the encryption keys securely while at the same time enabling efficient and reliable access to the encryption keys in order to enable decryption of the data objects when desired. Such encryption key management may be challenging when a large number of data objects (e.g., several billion) are involved and each data object has its own unique key.

One example of a challenge that may be encountered in the area of encryption key management is implementing a scalable encryption key store that is both highly secure and highly reliable, such that the encryption key store can tolerate some amount of data store-level failure events (e.g., communication failures, data corruptions, or power outages), catastrophic region-level events (e.g., natural disasters like an earthquake) and/or some level of security breach (e.g., machines in a data center being hacked by cyber intruders).

As disclosed herein, a large-scale encryption key store may be implemented across multiple computer systems. Individual encryption keys may be partitioned into multiple encryption key fragments that then are stored in different ones of the computer systems. For example, the encryption key fragments may be distributed across computer systems located in different geographic regions in a manner that facilitates timely reconstruction of the encryption keys and that protects against the computer systems in a geographic region being compromised by a catastrophic failure such as might be caused by a natural disaster.

According to techniques described herein, a single master key may not be required to protect the encryption keys, and the configuration of the distributed encryption key store may make it impractical for individual computer systems storing encryption key fragments to collude to reconstruct complete encryption keys. In addition, access controls may be built into the mechanisms for retrieving and/or deleting the individual fragments of encryption keys, thereby providing an additional or alternative layer of protection against unauthorized reconstruction of the encryption keys. Furthermore, the techniques that are used to partition the encryption keys into encryption key fragments may enable reconstruction of encryption keys even in the face of data store-level failures or region-level failures, while also providing some measure of security against data store-level security breaches.

Figure 1:
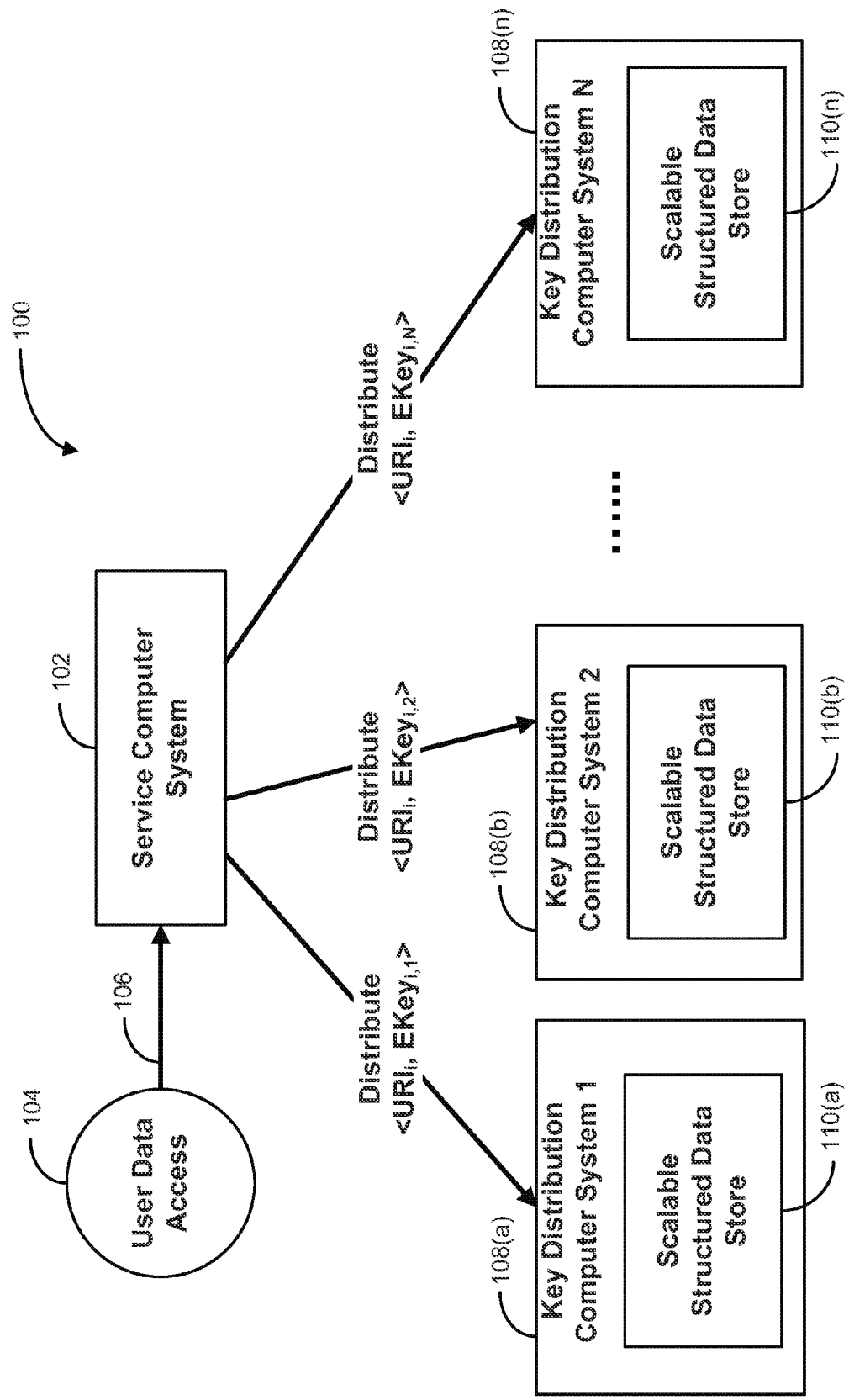
FIGS. 1-4 are block diagrams of examples of data management systems.

FIG. 1 is a block diagram of an example of a data management system 100. As illustrated in FIG. 1, the data management system 100 includes a service computer system 102 that is configured to provide a service that involves an element of data management (e.g., management and storage of personal information, such as, for example, medical data and/or credit card numbers) to other electronic devices 104 (e.g., personal computers, including desktop, laptop, tablet, and netbook computers, Smartphones, and personal digital assistants (PDAs), special-purpose computers, servers, and/or mainframe computers) over a network connection 106 (e.g., a local area network (LAN) and/or a wide area network (WAN), including the Internet). In addition, the data management system 100 includes multiple different key distribution computer systems 108(a)-108(n) that are accessible to the service computer system over a network connection.

Each computer system 102 and 108(a)-108(n) may be implemented as one or more computing devices (e.g., personal computers, general purpose computers, servers, mainframe computers, and/or combinations thereof). Each of these computing devices may have internal or external storage components storing data and programs such as an operating system and one or more application programs. The one or more application programs may be implemented as instructions that are stored in the storage components and that, when executed, cause the one or more computing devices to provide functionality described herein. In addition, each computing device may include one or more processors for executing instructions stored in storage and/or received from one or more other electronic devices. Each computing device also typically includes one or more network interfaces and communication devices for sending and receiving data. Moreover, each computer system 102 and 108(a)-108(n) may occupy one or more dedicated rooms and/or a dedicated building, and each computer system 102 and 108(a)-108(n) may be physically separated from each other computer system 102 and 108(a)-108(n), in some cases by large distances (e.g., thousands of miles).

In connection with providing the service involving the element of data management, the service computer system 102 is configured to receive and, in some cases, store data objects from the other electronic devices 104. Before data objects received from the other electronic devices 104 are stored, the service computer system 102 may determine to encrypt the received data objects.

For each data object that the service computer system 102 determines to encrypt, the service computer system 102 may use a corresponding unique encryption key to encrypt the data object. After a data object has been encrypted, the service computer system 102 may remove the unencrypted form of the data object from the service computer system 102 (e.g., the service computer system 102 may delete or otherwise erase the unencrypted form of the data object) and store the encrypted form of the data object locally or at a remote computer system or other type of computer memory storage system (not shown). In some implementations, the encrypted form of the data object may be outsourced to a third-party data storage provider or other form of computer memory storage system for storage. In any case, the encrypted form of the data object may be stored at a computer memory storage system that is not under direct control of the data management system 100, is publicly accessible, or is otherwise insecure.

Each data object managed by the service provided by the service computer system 102 may be addressed by a unique Uniform Resource Identifier (URI) or other identifier. Moreover, as discussed above, each encrypted data object may be associated with a unique encryption key over its lifetime. As such, the encryption key for a particular data object may be represented according to a name-value format with the name being the URI or other identifier associated with the data object and the value being the encryption key, EKey, for example denoted as {URI, EKey}.

Instead of implementing an encryption key store using a single computer system, the encryption key store may be implemented across the multiple different key distribution computer systems 108(a)-108(n), with an individual encryption key, $EKey_i$, being partitioned into multiple key fragments, $EKey_{i,1}$, $EKey_{i,2}$, ... $EKey_{i,n}$, each of which is distributed to one of the key distribution computer systems 108(a)-108(n) for storage. For instance, in some implementations, the individual key fragments distributed to the different key distribution computer systems 108(a)-108(n) may be stored in scalable structured data stores at the different key distribution computer systems 108(a)-108(n). Examples of such scalable structured data stores include distributed hash tables and Google's Big Table. Of course, other data structures also may be employed at the key distribution computer systems 108(a)-108(n) to store the distributed encryption key fragments.

As illustrated in FIG. 1, there may be a number of key distribution computer systems 108(a)-108(n), n, and each encryption key may be partitioned into n encryption key fragments such that there is a 1:1 ratio between key distribution computer systems 108(a)-108(n) and encryption key fragments for a particular encryption key and such that each key distribution computer system 108(a)-108(n) stores a unique one of the n encryption key fragments. Alternatively, in other implementations, individual key distribution computer systems 108(a)-108(n) may store more than one encryption key fragment, while, in still other implementations, there may be more key distribution computer systems 108(a)-108(n) than there are encryption key fragments such that not all key distribution computer systems 108(a)-108(n) store an encryption key fragment.

Different techniques may be employed to partition an encryption key into fragments. For example, in some implementations, the service computer system 102 may use a secret sharing algorithm to partition encryption keys into encryption key fragments. Alternatively, in other implementations, the service computer system 102 may use an erasure coding algorithm to partition encryption keys into encryption key fragments. In either case, if a secret sharing scheme or an erasure coding scheme is used to partition the encryption key into fragments, the encryption key may be reconstructed from less than all of its encryption key fragments. That is to say, both secret sharing and erasure coding encryption key fragmentation schemes may enable an encryption key that has been partitioned into n different fragments to be reconstructed from some number, k, of the encryption key fragments that is less than n.

In some implementations, once an encryption key has been partitioned into fragments that have been distributed across the multiple key distribution computer systems 108(a)-108(n), an access control mechanism may be employed to restrict access to the distributed encryption key fragments to the service computer system 102 (or some other trusted delegate of the service computer system 102). In such implementations, there may be no need to use a master encryption key to protect the distributed encryption key fragments, because only the service computer system 102 (or some other trusted delegate of the service computer system 102) is authorized to retrieve the encryption key fragments from the key distribution computer system 108(a)-108(n). In fact, in some implementations, the access control mechanism employed may make it such that only the service computer system 102 even is able to determine which encryption key fragments correspond to particular encryption keys, thereby reducing the risk of renegade key distribution computer systems 108(a)-108(n) colluding to identify a sufficient number of encryption key fragments to reconstruct an encryption key.

Furthermore, partitioning the encryption key into fragments and distributing the fragments across multiple different key distribution computer systems 108(a)-108(n) for storage may provide additional security against a malicious intruder or colluding key distribution computer systems by requiring the malicious intruder or colluding key distribution computer systems to obtain access to a considerable number of encryption key fragments before the malicious intruder or colluding key distribution computer systems will be able to reconstruct an encryption key. At the same time, however, using a scheme such as secret sharing or erasure coding to partition the encryption key such that the encryption key can be reconstructed from less than all of its encryption fragments provides a reasonably high level of availability for the encryption key, because, even if certain key distribution computer systems fail or are otherwise unavailable, the encryption key still may be reconstructed so long as a sufficient number of the encryption key fragments remain accessible.

Figure 2:
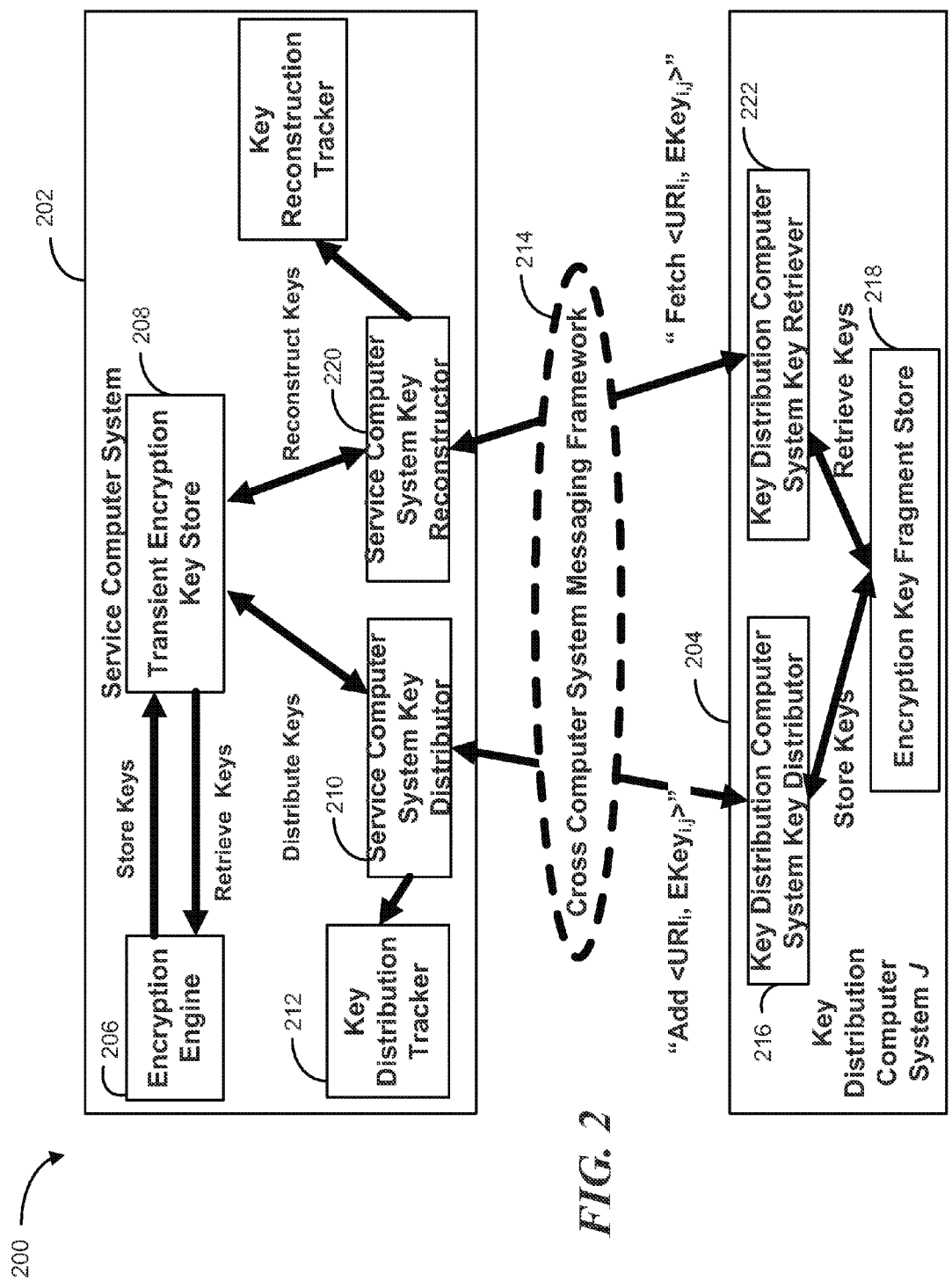

FIG. 2 is a block diagram of an example of a data management system 200 that illustrates examples of data flows between different components of the data management system 200.

As illustrated in FIG. 2, the data management system 200 includes a service computer system 202 and a key distribution computer system 204. For clarity and ease of illustration of the example data flows, only a single key distribution computer system 204 is shown in FIG. 2. However, it will be appreciated that the data management system 200 includes multiple key distribution computer systems, for example, like the data management system 100 illustrated in FIG. 1.

Among other features, the service computer system 202 is configured to receive user data objects for storage from other electronic communication devices (not shown). Before storing some of the user data objects it receives, the service computer system 202 encrypts them. Specifically, the service computer system 202 includes an encryption engine 206 that is configured to encrypt data objects. When the service computer system 202 determines to encrypt a data object, the encryption engine 206 takes the data object as an input and applies a unique encryption key, $EKey_i$, to the input data object to generate an encrypted form of the input data object.

After the encryption engine 206 has encrypted the data object, the encryption key, $EKey_i$, that was used to encrypt the data object is stored, at least for the moment, in a transient encryption key store 208 within the service computer system 202. In addition, for tracking purposes, an association may be established between the encryption key, $EKey_i$, and an identifier (e.g., a URI) assigned to the data object that was encrypted using the encryption key, $EKey_i$. Later, when it is desired to decrypt the encrypted data object, this association between the identifier assigned to the data object and the encryption key, $EKey_i$, may be used to identify the encryption key, $EKey_i$, as the encryption key to be used to decrypt the encrypted data object.

A service computer system key distributor 210 at the service computer system 202 accesses the encryption key, $EKey_i$, from the transient encryption key store 208 and partitions the encryption key, $EKey_i$, into multiple encryption key fragments. As discussed above, the service computer system key distributor 210 may use a secret sharing or an erasure coding algorithm to partition the encryption key, $EKey_i$, into the fragments. As such, the encryption key, $EKey_i$, may be partitioned into a number of encryption key fragments, n, and yet be capable of reconstruction from some number, k, of encryption key fragments that is less than all of the n encryption key fragments.

After partitioning the encryption key, $EKey_i$, into fragments, the service computer system key distributor 210 transmits requests to multiple different computer systems to store individual encryption key fragments. In addition to the encryption key fragments themselves, these storage requests also may include the identifier assigned to the encrypted data object (or some representation of the identifier assigned to the encrypted data object). For example, as illustrated in FIG. 2, the service computer system key distributor 210 transmits a request to the j-th key distribution computer system 204 to store the j-th encryption key fragment, $EKey_{i,j}$ (e.g., Add $\{URI_i, EKey_{i,j}\}$).

Additionally or alternatively, the storage requests may bear a hallmark of the service computer system 202. As will be described in greater detail below, this service computer system hallmark may serve as an access control mechanism, with the key distribution computer systems restricting retrieval of the encryption key fragments to only the service computer system 202 (or some trusted delegate of the service computer system 202). In one example, the service computer system 202 may sign the encryption key fragment storage requests that it issues with its private signing key. Such requests signed with the private signing key of the service computer system 202 may be considered to bear a hallmark of the service computer system 202 because the private signing key is a secret known only to the service computer system 202. Moreover, when the service computer system 202 issues an encryption key fragment storage request that is signed with its private signing key, the key distribution computer systems may be configured to restrict subsequent access to the encryption key fragment to requests that are signed with the same signing key. In a second example, the service computer system 202 may incorporate one or more other secret values known only to the service computer system 202 in encryption key fragment requests that it issues. Here again, these requests may be considered to bear a hallmark of the service computer system 202 because the one or more secret values incorporated within the storage requests are known only to the service computer system 202. Furthermore, when the service computer system 202 issues an encryption key fragment storage request within which one or more secret values known only to the service computer system 202 are incorporated, the key distribution computer system may be configured to restrict subsequent access to the encryption key fragment to requests within which the same one or more secret values are incorporated.

In some implementations, the service computer system key distributor 210 may distribute only a single encryption key fragment to each key distribution computer system. In some alternative implementations, the service computer system key distributor 210 may distribute more than one encryption key fragment to one or more of the key computer systems.

As part of transmitting the encryption key fragment storage requests to the different key distribution computer systems, the service computer system key distributor 210 may log each request in a key distribution tracker 212 maintained by the service computer system 202.

A network 214 may provide direct or indirect communication links between the service computer system 202 and each of the key distribution computer systems. Examples of this network 214 include the Internet, the World Wide Web, wide area networks (WANs), local area networks (LANs), analog or digital wired and wireless telephone networks, radio, television, cable, satellite, and/or any other delivery mechanisms for carrying data. A message exchange framework may be implemented over this network 214 in order to enable the exchange of messages between the service computer system 202 and the key distribution computer systems. In some implementations, this message exchange framework may be implemented via a scalable message queue mechanism. Examples of such scalable message queue mechanisms that may be used to implement the message exchange framework include RabbitMQ or ActiveMQ from Apache. In some implementations, this message exchange framework may be implemented via a remote procedure call (RPC) mechanism or a web service invocation mechanism.

Each key distribution computer system may include a key distribution computer system distributor that is configured to receive encryption key fragments from the service computer system 202 and an encryption key fragment store that is configured to store received encryption key fragments. For example, as illustrated in FIG. 2, the key distribution computer system key distributor 216 at the j-th key distribution computer system 204 receives the j-th encryption key fragment storage request to store the j-th encryption key fragment, $EKey_{i,j}$, transmitted by the service computer system 202 and stores the j-th encryption key fragment, $EKey_{i,j}$, to the key distribution computer system's encryption key fragment store 218 along with an indication of the association between the encryption key fragment, $EKey_{i,j}$, and the identifier assigned to the data object. In addition, the key distribution computer system 204 also may send an acknowledgement (e.g., Add $\{URI_i, EKey_{i,j}\}$ OK,) to the service computer system 202 to signal that the encryption key fragment, $EKey_{i,j}$, has been stored successfully.

Upon receiving positive acknowledgement from the j-th key distribution computer system 204 that the encryption key fragment, $EKey_{i,j}$, has been stored successfully, the service computer system key distributor 210 updates the key distribution tracker 212 log to reflect that the encryption key fragment, $EKey_{i,j}$, was stored successfully. Using the key distribution tracker 212 log, the service computer system key distributor 210 can monitor the status of the storage requests sent to each of the key distribution computer systems.

Due to key distribution computer system or network 214 failure, encryption key fragment storage requests transmitted by the service computer system 202 to one or more of the key distribution computer systems may not be received or acted upon successfully by one or more of the key distribution computer systems in the first instance. Therefore, the service computer system key distributor 210 intermittently (e.g., periodically) may assess the status of confirmation messages received from the key distribution computer systems to which storage requests were sent and resend storage requests to each of the key distribution computer systems from which a confirmation message has not yet been received.

Once the service computer system 202 has received confirmations from a sufficient number of the key distribution computer systems to which encryption key fragment storage requests were sent, the service computer system key distributor 210 may declare the distribution of the encryption key fragments a success, which, in turn, may trigger the service computer system 202 to remove (e.g., delete or otherwise erase) the encryption key, $EKey_i$, from the transient encryption key store 208 at the service computer system 202. In some implementations, the service computer system key distributor 210 may wait until confirmations have been received from all of the key distribution computer systems to which key fragment storage requests were sent before declaring the distribution a success. In other implementations, the service computer system key distributor 210 may determine that a sufficient number of the key distribution computer systems have confirmed successful storage of the encryption key fragments and declare the distribution a success before the service computer system key distributor 210 has received confirmations from all of the key distribution computer systems to which key fragment storage requests were sent. For example, the service computer system key distributor may calculate a threshold number of confirmations needed to be received in order to declare a distribution a success by balancing the tradeoff between key distribution performance (e.g., the time required to complete the distribution of the encryption key fragments to different key distribution computer systems) and reliability, understanding that the more encryption key fragments that are stored successfully before declaring the distribution a success, the more likely it is that the encryption key will be able to be reconstructed. In some implementations, the service computer system key distributor 210 may calculate the threshold number on the fly at the time of the distribution, whereas, in other implementations, the service computer system key distributor 210 may calculate the threshold number in advance.

After successful distribution of the encryption key fragments, the service computer system 202 may store the encrypted data object and remove (e.g., delete or otherwise erase) the unencrypted data object from the service computer system 202. In some implementations, the service computer system 202 may store the encrypted data object locally. Additionally or alternatively, the service computer system 202 may transmit the encrypted data object to a remote computer system (not shown) for storage. In some cases, the remote computer system may be owned and/or operated by a third-party. However, even in such cases, the data object remains secure because it is encrypted.

In some implementations, for groups of data objects that the service computer system 202 encrypts within a short period of time, the service computer system key distributor 210 may bundle corresponding encryption key fragment storage requests together for transmission to individual key distribution computer systems as a single message in order to improve data communication efficiency. Correspondingly, the individual key distribution computer systems also may bundle multiple acknowledgement messages together for encryption key fragments that they store within a short period of time of one another.

In addition to managing the storage of encrypted data objects and their associated encryption keys, the data management system 200 also manages the retrieval of encryption keys and the decryption of data objects using such retrieved encryption keys. When a need arises for an encrypted data object to be decrypted, the service computer system 202 identifies the identifier (e.g., URI) for the data object and the service computer system key reconstructor 220 issues a request to each of the key distribution computer systems to retrieve encryption key fragments associated with the identifier for the data object. For example, as illustrated in FIG. 2, when a need arises to decrypt the i-th data object, the service computer system key reconstructor 220 may issue an encryption key fragment retrieval message (e.g., retrieve key of $URI_i$) to all key distribution computer systems that store encryption key fragments.

As described briefly above and as will be described in greater detail below, in some implementations, encryption key fragment storage requests issued by the service computer system 202 bear hallmarks of the service computer system 202 that function as access controls by asserting ownership of the encryption key fragments by the service computer system 202. In such implementations, the key distribution computer systems may be configured to limit retrieval of encryption key fragments that were received in connection with storage requests bearing such hallmarks of the service computer system 202 only to entities that can prove ownership of the encryption key fragments (e.g., the service computer system 202 or some trusted delegate of the service computer system 202). Therefore, in these implementations, the encryption key fragment retrieval requests issued by the service computer system 202 also may bear hallmarks of the service computer system 202. As such, when a key distribution computer system receives an encryption key fragment retrieval request from the service computer system 202, the key distribution computer system may validate that the hallmark borne by the retrieval request demonstrates ownership of the encryption key fragment before allowing the service computer system 202 to retrieve the encryption key fragment. In contrast, if an encryption key fragment request is received from a malicious intruder who is unable to demonstrate ownership of the encryption key fragment, the key distribution computer system is configured to deny the encryption key fragment retrieval request.

The key distribution computer systems include key distribution computer system retrievers that are configured to receive and act upon encryption key retrieval requests received from the service computer system. For example, the j-th key distribution computer system 204 includes key distribution computer system retriever 222. When the key distribution computer system retrievers receive a retrieval request, they identify any encryption key fragments stored in their encryption key fragment stores that are associated with the identifier for the relevant data object and return the identified encryption key fragments to the service computer system 202.

After the key distribution computer systems return a sufficient number of encryption key fragments associated with the data object, the service computer system reconstructor 220 reconstructs the encryption key for the data object from the returned encryption key fragments. The reconstructed encryption key then is transferred to the transient encryption key store 208 from which it is accessed by the encryption engine 206 in the data management system 200 to decrypt the data object.

The data management system 200 also manages the expiration of encrypted data objects when they reach the end of their lifetimes. In some implementations, the data management system 200 expires an encrypted data object that has reached the end of its lifetime by removing (e.g., deleting or otherwise erasing) its encryption key rather than actually acting upon the data object itself. This is possible because the encrypted data object cannot be decrypted without its encryption key, so removing the encryption key effectively expires the encrypted data object. Moreover, expiring the encrypted data object in this fashion may be useful in implementations in which the encrypted data object itself has been outsourced for storage to a third party and, thus, is not directly accessible to the data management system 200.

There are at least two conditions that may trigger the expiration of a data object. First, the data object may be assigned a lifetime having a certain time period, and, when this time period elapses, the data object may be expired. Second, a user or application may make an explicit request for the data object to be expired.

Each service computer system 202 may be equipped with a policy enforcement controller. When the policy enforcement controller detects that a data object's retention time has expired, the service computer system 202 may issue a key deletion message (e.g., "Delete Key for $URI_i$") to all the key distribution computer systems. Thereafter, the policy enforcement controller may monitor responses received from the various key distribution computer systems, keeping track of whether positive acknowledgements (e.g., "Delete {URIi, $EKey_{i,j}$} OK") are returned from each of the key distribution computer systems to make sure that enough of the encryption key fragment deletion requests are faithfully carried out by each of the key distribution computer systems so that the encryption key cannot be reconstructed. If a period of time elapses and acknowledgement messages have not been received from each of the key distribution computer systems, the policy enforcement controller may resend deletion messages to those key distribution computer systems that have not yet confirmed successful deletion. As will be understood, a similar protocol may be followed in order to delete appropriate encryption key fragments when an explicit request to expire a particular data object is received from a user or other application.

As discussed above, a data management system may be configured such that encryption key fragment retrieval or removal is allowed only when the service computer system making the request demonstrates authorization to make the request. In some implementations, the ownership of an encryption key may be tracked and used as a mechanism for controlling access to the encryption key. In such implementations, requests to store encryption key fragments issued by service computer systems may bear hallmarks of the service computer systems that assert ownership over the encryption key fragments by the corresponding service computer systems making the storage requests, and the key distribution computer systems may be configured to restrict access to the encryption key fragments to their owners.

Figure 3:
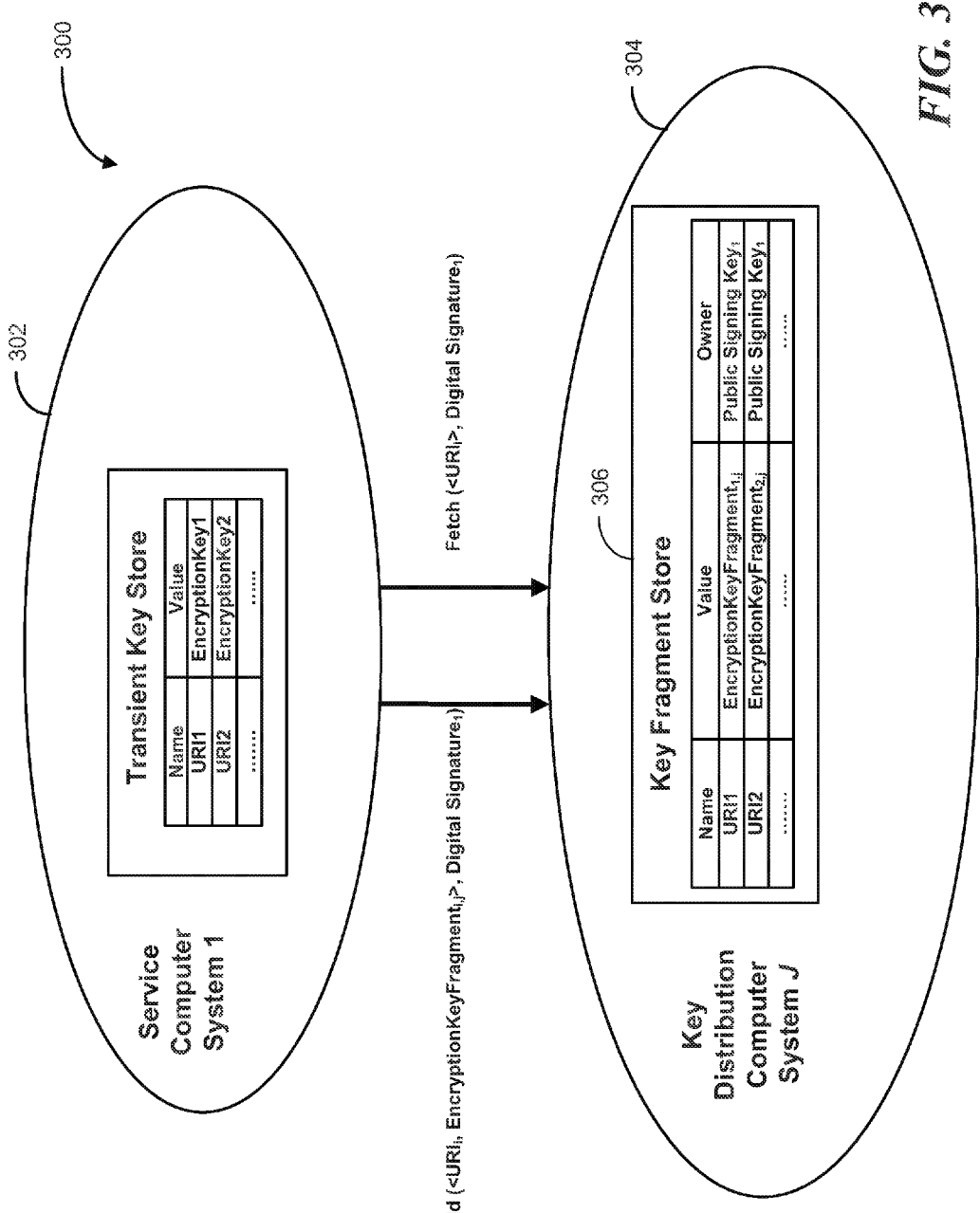

Referring to FIG. 3, in one example data management system 300, ownership of encryption key fragments may be represented by a public key of the service computer system 302 that created the encryption key from which the encryption key fragments were derived and that distributed the resulting encryption key fragments to the key distribution computer systems 304. As illustrated in FIG. 3, in such implementations, when the service computer system 302 issues a request to store an encryption key fragment, the service computer system 302 may sign the request using the service computer system's private signing key. This digital signature of the request using the service computer system's private key may be considered a hallmark of the service computer system 302. When a key distribution computer system 304 receives the storage request, the key distribution computer system 304 may verify that the digital signature of the storage request corresponds to an approved service computer system, for example, using the approved service computer system's public signing key, which is known by the key distribution computer system 304, before storing the encryption key fragment. Additionally, as part of storing the encryption key fragment, the key distribution computer system 304 also may store the public signing key of the service computer system 302 (or some other representation of ownership by the service computer system 302) in a manner that reflects the ownership relationship. For instance, the key distribution computer system 304 may store the encryption key fragment in a table 306 with the public signing key of the service computer system 302 being stored in the same row within the table 306 as the encryption key fragment.

Like a request to store an encryption key fragment, when the service computer system 302 issues a request to retrieve or delete an encryption key fragment, the service computer system 302 also may sign the retrieval or deletion request with the service computer systems' private signing key. When the key distribution computer system 304 receives such a retrieval or deletion request, before acting on the request, the key distribution computer system 304 may use the public signing key of the service computer system 302, which is known by the key distribution computer system 304 and which may be associated with the encryption key fragment (e.g., stored in the same row as the encryption key fragment), to verify that the digital signature of the retrieval or deletion request demonstrates authorization to access the encryption key fragment.

Figure 4:
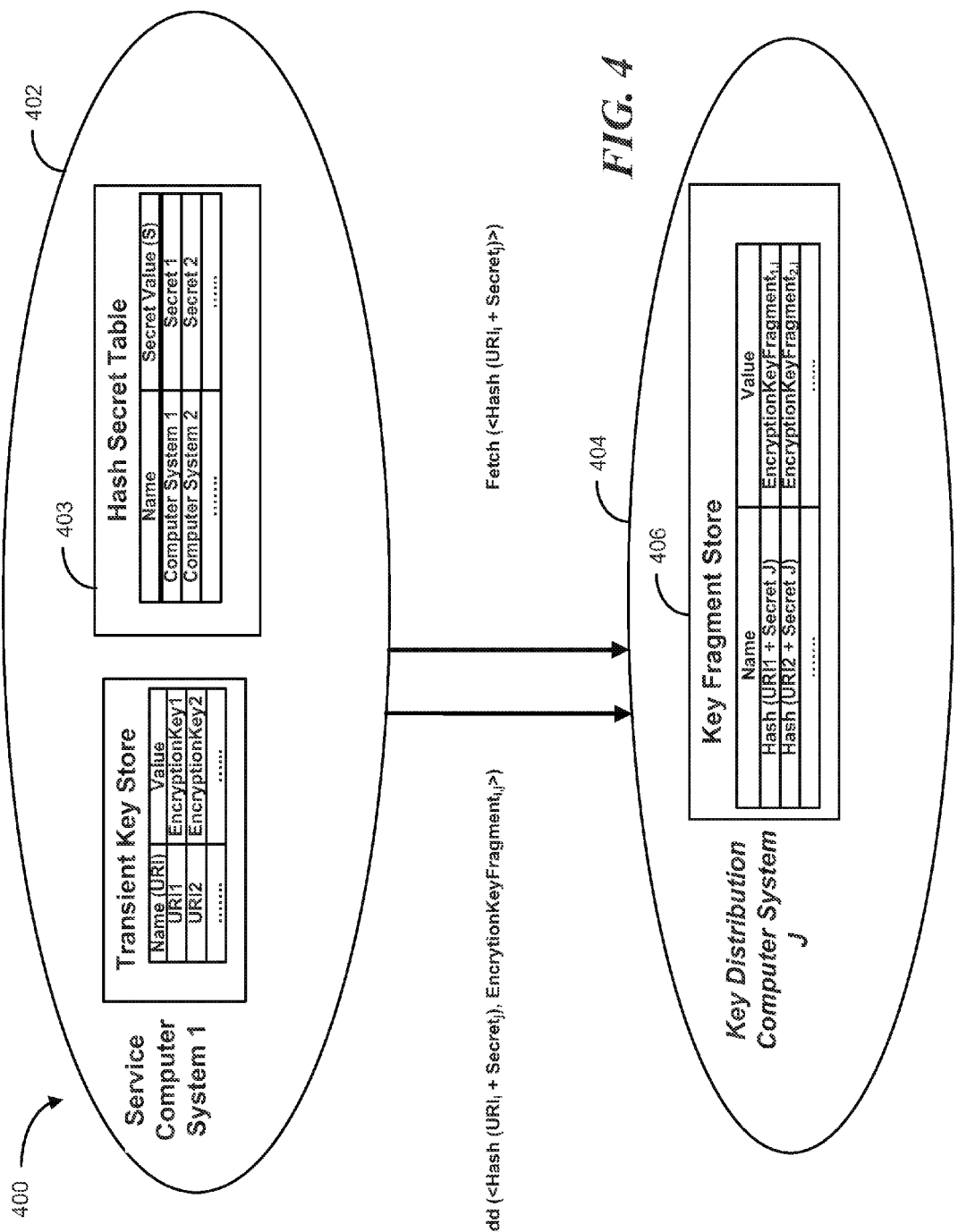

Referring to FIG. 4, in a second example of a data management system 400, ownership of encryption key fragments derived from an encryption key may be represented by a secret value known only to the service computer system 402 that owns the encryption key fragment. In such implementations, use of such a secret value within a storage request issued by the service computer system 402 may be considered a hallmark of the service computer system 402 issuing the request that asserts ownership over the encryption key fragment by the service computer system 402. As illustrated in FIG. 4, in such implementations, the service computer system 402 may maintain unique and secret identifiers for each of the key distribution computer systems, for example in a secret table 403. The service computer system 402 may employ a variety of different techniques to ensure that the unique and secret identifiers for the key distribution computer systems are stored persistently, reliably, and securely at the service computer system 402.

Then, when the service computer system 402 sends a request to store an encryption key fragment to a particular one of the key distribution computer systems 404, j, the service computer system 402 may apply a hash function to the combination of the identifier (e.g., $URI_i$) associated with the data object encrypted using the encryption key and the secret, unique identifier for the particular key distribution computer system 404, j, represented as Hash ($URI_i$+$Secret_j$). One example of a one-way hash function that may be used to generate the hash of the identifier (e.g., URI) for the data object may be SHA-256.

As further illustrated in FIG. 4, in such implementations, when the key distribution computer system 404, j, receives an encryption key fragment storage request including the hash result of the identifier of a data object, i, and the secret, unique value for the key distribution computer system 404, j, the key distribution computer system 404 may store both the encryption key fragment and the unique hash result of the combination of the data object identifier and the secret, unique value for the key distribution computer system 404 in a manner that reflects the relationship between the two, for example in name-value format as {Hash (URI$_i$+Secret$_j$), Ekey$_{i,j}$}. In this manner, the hash result of the combination of the data object identifier and the secret, unique value for the key distribution computer system 404 serves as the name for the encryption key fragment within the encryption key fragment store 406 at the key distribution computer system 404.

Incorporating the secret, unique identifiers for the key distribution computer systems into the value to which the hash function is applied serves as a barrier against collusion by the key distribution computer systems by producing hashes of the identifier (e.g., URI) for the data object that are unique for each key distribution computer system. As a result, it may be impractical for colluding key distribution computer systems to determine which encryption key fragments belong to the same data object, because the hash result of the data object identifier is different at each key distribution computer system. However, because the service computer system 402 that owns the encryption key fragment knows both the data object identifier (e.g., URI), and the secret, unique values for each of the key computer systems, the service computer system 402 is able to construct correct replicas of the hashed data object identifiers, and, therefore, the service computer system 402 is able to demonstrate ownership of the encryption key fragments.

For example, when the service computer system 402 desires to retrieve or delete the encryption key fragment corresponding to the data object, i, from the key distribution computer system 404, j, the service computer system 402 may request that the key distribution computer system 404, j, retrieve or delete the encryption key fragment corresponding to the hash result of the identifier of the data object (e.g., URI$_i$) and the secret, unique value for the key distribution computer system 404, j. In response, the key distribution computer system 404 may retrieve or delete the corresponding encryption key fragment from the encryption key fragment store 406. Because only the service computer system 402 knows the secret, unique value for the key distribution computer system 404, j, only the service computer system 402 is able to re-create the hash result of the identifier of the data object (i.e., URI$_i$) and the secret, unique value for the key distribution computer system 404, j. Thus, only the service computer system 402 is able to retrieve or delete the encryption key fragment from the encryption key fragment store 406 because only the service computer system is able to re-create the name for the encryption key fragment from the encryption key fragment store 406.

In addition or as an alternative to maintaining secret, unique values for each of the key distribution computer systems, in some implementations, the service computer system may maintain the identifiers for data objects (e.g., URIs) as unguessable secret values. In such implementations, the service computer system again will be the only entity able to re-create the hash results of the identifiers for the data objects and the values for the key distribution computer system, again making collusion between key distribution computer systems impractical.

In some implementations, a service computer system and key distribution computer systems may be placed in the same geographic region so that the service computer system is close to the key distribution computer systems, which may result in relatively low communication latency. Alternatively, the key distribution computer systems may be placed in different geographic regions from one another and/or the service computer system, which may provide enhanced resiliency to natural disasters.

In some implementations, a session-based key reconstruction mechanism may be employed to reconstruct encryption keys for related data objects. In particular, a data management system may maintain one or more application-specific index tables that identify related data objects (e.g., data objects related to a specific user) such that when a user application session is established with the data management service, the data management system is able to access the index table specific to the application and identify data objects that may be related to one another and that potentially may be accessed during the user application session. Additionally or alternatively, after a specific data object has been accessed, the index tables may enable the data management system to identify other data objects that may be related to the specific data object and that are likely to be accessed in the near future. Once such a target data object set has been identified, the service computer system key reconstructor may issue bulk requests for all the encryption keys fragments belonging to the data objects in the target data object set, Correspondingly, in response to such bulk requests, individual key distribution computer systems may return bulk retrieval messages with the encryption key fragments belonging to all of the data objects in the target data object set. The service computer system key reconstructor then can reconstruct the encryption keys for the data objects in the target data object set based on the returned bulk messages and populate the reconstructed keys to the transient encryption key store, from which they may be accessed when desired.

Figure 5:
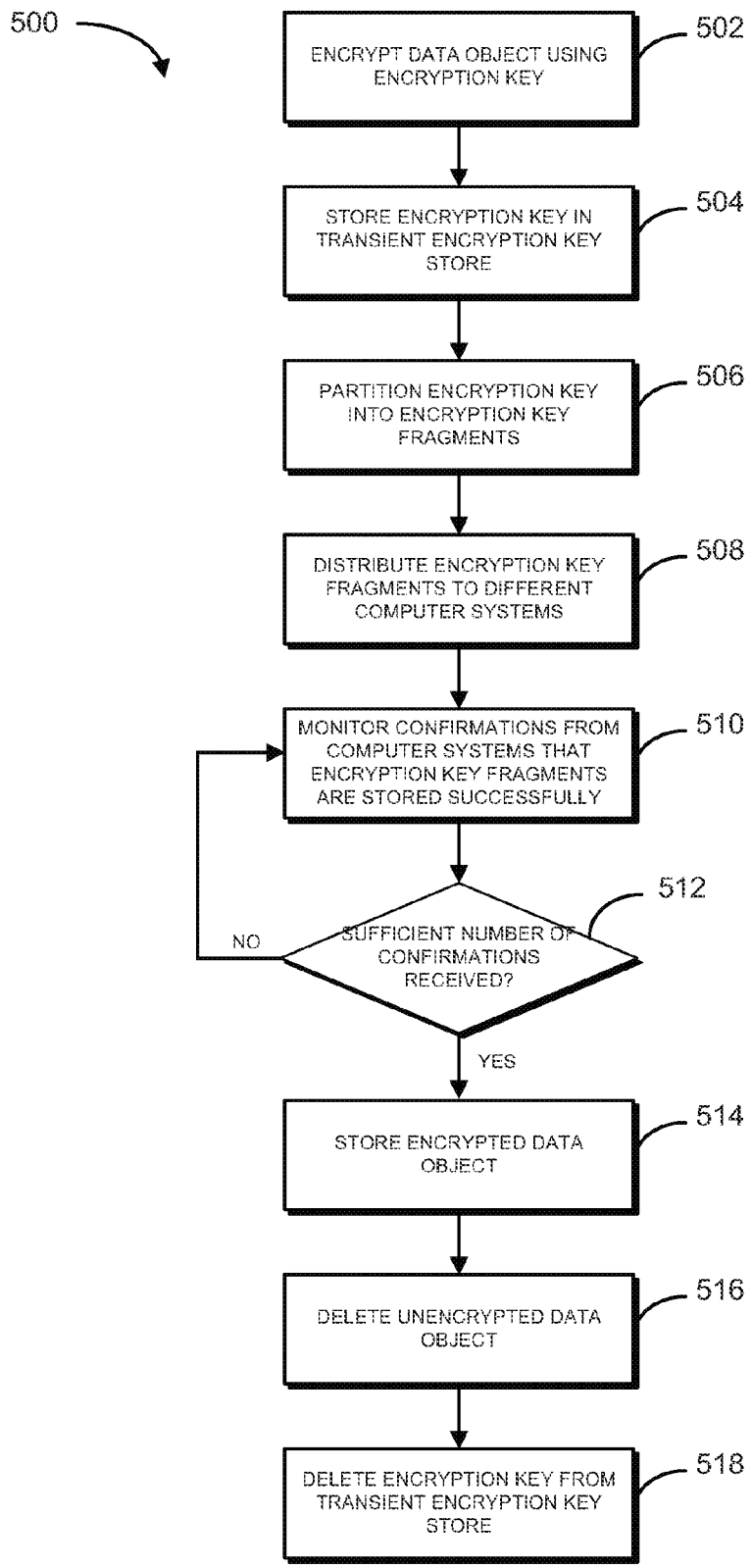
FIG. 5 is a flowchart of an example of a process for managing an encryption key.

FIG. 5 is a flowchart 500 of an example of a process for managing an encryption key. The process illustrated in the flowchart 500 may be performed by a service computer system such as one of the service computer systems 102, 202, 302, and 402 illustrated in FIGS. 1-4. More specifically, the process illustrated in the flowchart 500 of FIG. 5 may be performed by one or more processing elements of the computing device(s) that implement such computer systems as a consequence of executing instructions stored on computer-readable storage media accessible to the computer system.

The process begins when the service computer system encrypts a data object using an encryption key (502). The service computer system stores the encryption key in a transient encryption key store at the service computer system (504) and partitions the encryption key into a number of encryption key fragments (506). For example, the service computer system may employ a secret sharing or erasure coding scheme to partition the encryption key into a number of encryption key fragments such that the encryption key may be reconstructed from less than all of the encryption key fragments.

After partitioning the encryption key into fragments, the service computer system distributes the fragments of the encryption key to multiple different computer system for storage (508). In some implementations, the service computer system may distribute only a single encryption key fragment to each other computer system. In alternative implementations, the service computer system may distribute more than one encryption key fragment to some or all of the other computer systems.

Distributing the fragments of the encryption key in this fashion adds a layer of security to the encryption key that makes it more difficult for the computer systems to collude to reconstruct the encryption key from the fragments that they store. For example, assuming that the encryption key was partitioned into n fragments, that the encryption key can be reconstructed from some number k less than n of the fragments of the encryption key, and that the service computer system distributed each of the n fragments of the encryption key to a different computer system, at least k of the computer systems would need to collude in order to be able to reconstruct the encryption key.

In some implementations, the data object that was encrypted using the encryption key may be addressed or otherwise identified by a unique identifier (e.g., a URI). In such implementations, the service computer system may transmit an indication of this unique identifier (e.g., URI) for the data object along with each of the fragments of the encryption key. For example, the service computer system may distribute the unique identifier for the data object and the individual encryption key fragments as name-value pairs to the different computer systems. Then, when the service computer system later wishes to retrieve and/or delete the individual encryption key fragments stored by the other computer systems, the service computer system simply may request that the other computer systems retrieve and/or delete the encryption key fragments corresponding to the unique identifier for the data object.

To provide additional security for the encryption key, in some implementations, the service computer system may use a private signing key to digitally sign the encryption key fragment storage requests that the service computer system sends to the other computer systems. The other computer systems, knowing the public key for the service computer system, then may verify the identity of the service computer system that sent the encryption key fragment storage request and interpret the digital signature of the service computer system as an assertion of ownership over the encryption key fragments. Consequently, the other computer systems may restrict future access to the encryption key fragments to the service computer system that distributed the encryption key fragments (or some trusted delegate) by only granting access requests that similarly are signed with the private signing key of the service computer system.

Furthermore, to protect against collusion by the other computer systems, in some implementations, the service computer system may generate hash results of the unique identifier (e.g., URI) for the data object that are unique for each computer system and send these unique hash results to the other computer systems instead of the unique identifier (e.g., URI) for the data object itself. For example, by applying a hashing function to the combination of the unique identifier (e.g., URI) for the data object and unique values for each of the other computer systems that are known only to the service computer system, the service computer system can generate unique hash results of the identifier (e.g., URI) for the data object for each of the other computer systems. The service computer system then may transmit the unique hash results of the identifier (e.g., URI) of the data object and the fragments of the encryption key to the other computer systems as name-value pairs.

Then, when the service computer system later wishes to retrieve and/or delete the individual encryption key fragments stored by the other computer systems, the service computer system may re-compute the unique hash results of the identifier (e.g., URI) for the data object for each of the other computer systems and include these re-computed hash results when sending retrieval and/or deletion requests to the other computer systems. Because only the service computer system knows these unique hash results for the different computer systems, this scheme may make collusion among the different computer systems to reconstruct encryption keys from the encryption key fragments impractical.

Encryption key fragment storage requests that are digitally signed using the private signing key of the service computer system and encryption key fragment requests that include hash results of the identifier (e.g., URI) for the data object that are unique for each computer system both may be said to bear hallmarks of the service computer system as both bear indicia of values known only to the service computer system. In the case of the requests that are digitally signed using the private signing key of the service computer system, the private signing key is a value known only to the service computer system. Similarly, in the case of the requests that include hash results of the identifier (e.g., URI) for the data object that are unique for each computer system, the unique hash results are obtained by combining the identifies (e.g., URI) for the data object with unique values for the different computer systems that are known only by the service computer system.

After distributing the fragments of the encryption key to the different computer systems, the service computer system monitors incoming acknowledgements from the service computer systems that confirm that individual encryption key fragments have been stored successfully (510). Then, when the service computer system determines that some sufficient number of the encryption key fragments have been stored (512), the service computer system stores the encrypted form of the data object (e.g., locally or at a remote data storage facility, perhaps maintained by a third party) (514), deletes the unencrypted form of the data object (516), and deletes the encryption key from the transient encryption key store at the service computer system (518).

Figure 6:
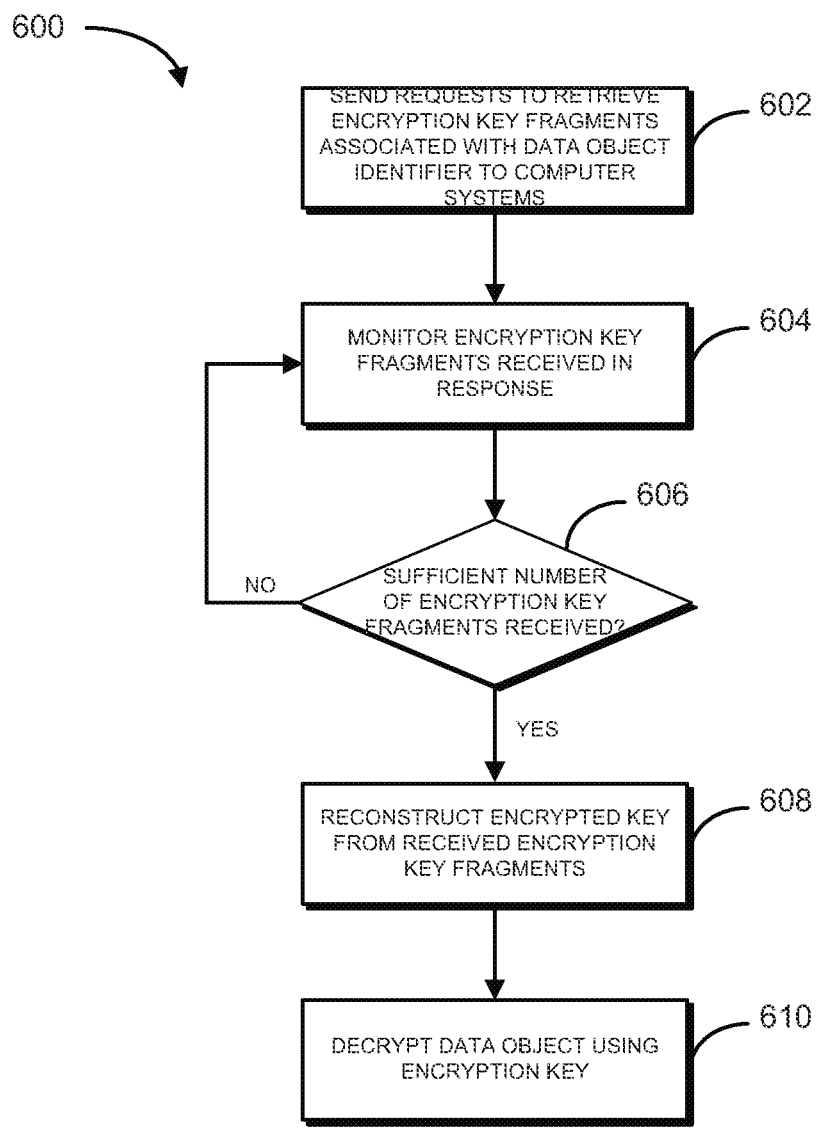
FIG. 6 is a flowchart of an example of a process for reconstructing an encryption key from distributed encryption key fragments.

FIG. 6 is a flowchart 600 of an example of a process for reconstructing an encryption key from encryption key fragments that have been distributed across a number of different computer systems. The process illustrated in the flowchart 600 may be performed by a service computer system such as one of the service computer systems 102, 202, 302, and 402 illustrated in FIGS. 1-4. More specifically, the process illustrated in the flowchart 600 of FIG. 6 may be performed by one or more processing elements of the computing device(s) that implement such computer systems as a consequence of executing instructions stored on computer-readable storage media.

The service computer system sends requests to retrieve encryption key fragments associated with a particular data object to the computer systems configured to store encryption key fragments (602). For example, in cases where the service computer system distributed the fragments of the encryption key that the service computer system now desires to reconstruct in a name-value format along with the identifier (e.g., URI) for the data object, the service computer system may send requests to retrieve fragments of the encryption key that are associated with the identifier (e.g., URI) for the data object to the other computer systems. Likewise, in cases where the service computer system used its private signing key to digitally sign the storage requests that it issued to the other computer systems to store the fragments of the encryption key that the service computer system now desires to reconstruct, the service computer system similarly may sign its retrieval requests with its private signing key. Furthermore, in cases where the service computer system generated unique hash results of the identifier (e.g., URI) for the data object for each of the different computer systems, the service computer system may re-compute the unique hash results of the identifier (e.g., URI) for the data object and include the corresponding unique hash results in its retrieval requests to the individual computer systems.

After sending the requests to retrieve the fragments of the encryption key to the computer systems, the service computer system monitors the fragments of the encryption key received from the other computer systems in response (604). Then, after determining that a sufficient number of the fragments of the encryption key have been received from the other computer systems to reconstruct the encryption key (606), the service computer system re-creates the encryption key based on the fragments of the encryption key received from the other computer systems (608). Thereafter, the service computer system is able to use the reconstructed encryption key to decrypt the particular data object (610).

The distribution of encryption key fragments may involve specific placement techniques intended to facilitate timely reconstruction of an encryption key while also providing protection against both data store-level failures and higher-level failures (e.g., region-level failures like natural disasters). For example, when an encryption key is fragmented into n encryption key fragments according to a scheme that enables the encryption key to be reconstructed from k<n fragments, sets of at least k encryption key fragments may be distributed across data stores located in multiple different geographic regions. In this manner, because at least k encryption key fragments have been distributed to data stores in each of multiple different geographic regions, even if a catastrophic failure such as a natural disaster makes it impossible (or difficult, costly, slow, etc.) to retrieve the encryption key fragments distributed to data stores in one region, the encryption key still may be able to be reconstructed from encryption key fragments distributed to one or more other regions.

Furthermore, within each geographic region, the encryption key fragments may be distributed across data stores realized in different availability zones. In fact, in some implementations, a constraint may be imposed that no more than k−1 encryption key fragments are distributed to data stores realized in any one availability zone within a geographic region. Consequently, if the security of one of the availability zones in a region is compromised by a malicious intruder, the malicious intruder still may not be able to reconstruct the encryption key because the number of encryption key fragments stored in the data stores realized in the compromised availability zone is insufficient to reconstruct the encryption key.

The remainder of this disclosure describes placement and retrieval techniques for distributing encryption key fragments across different data stores and thereafter retrieving the distributed encryption key fragments. Although the placement techniques described below generally are described in the context simply of distributing encryption key fragments, it will be appreciated that the distribution of any encryption key fragment may be accompanied by the distribution of a corresponding value in a name-value pair and/or by any of the other corresponding information related to the encryption key fragment being distributed described above even if not explicitly mentioned as such in the below discussion.

For example, reference below to the distribution of an encryption key fragment may include distribution of both (1) the encryption key fragment and (2) the URI for the data object encrypted using the encryption key from which the encryption key fragment was derived. Alternatively, reference below to the distribution of an encryption key fragment also may include distribution of both (1) the encryption key fragment and (2) a hash value resulting from the performance of a hashing algorithm on a combination of the URI for the data object encrypted using the encryption key from which the encryption key fragment was derived, and a secret value for the data store to which the encryption key fragment is being distributed.

Similarly to how the encryption key fragment placement techniques are described below, the encryption key fragment retrieval techniques described below may be accomplished in a manner that is consistent with the encryption key retrieval techniques described above even if not explicitly described as such in the below discussion. For example, encryption key fragments to be retrieved may be identified in an encryption key fragment retrieval request by corresponding values from name-value pairs that were generated as part of the distribution of the encryption key fragments.

Figure 7:
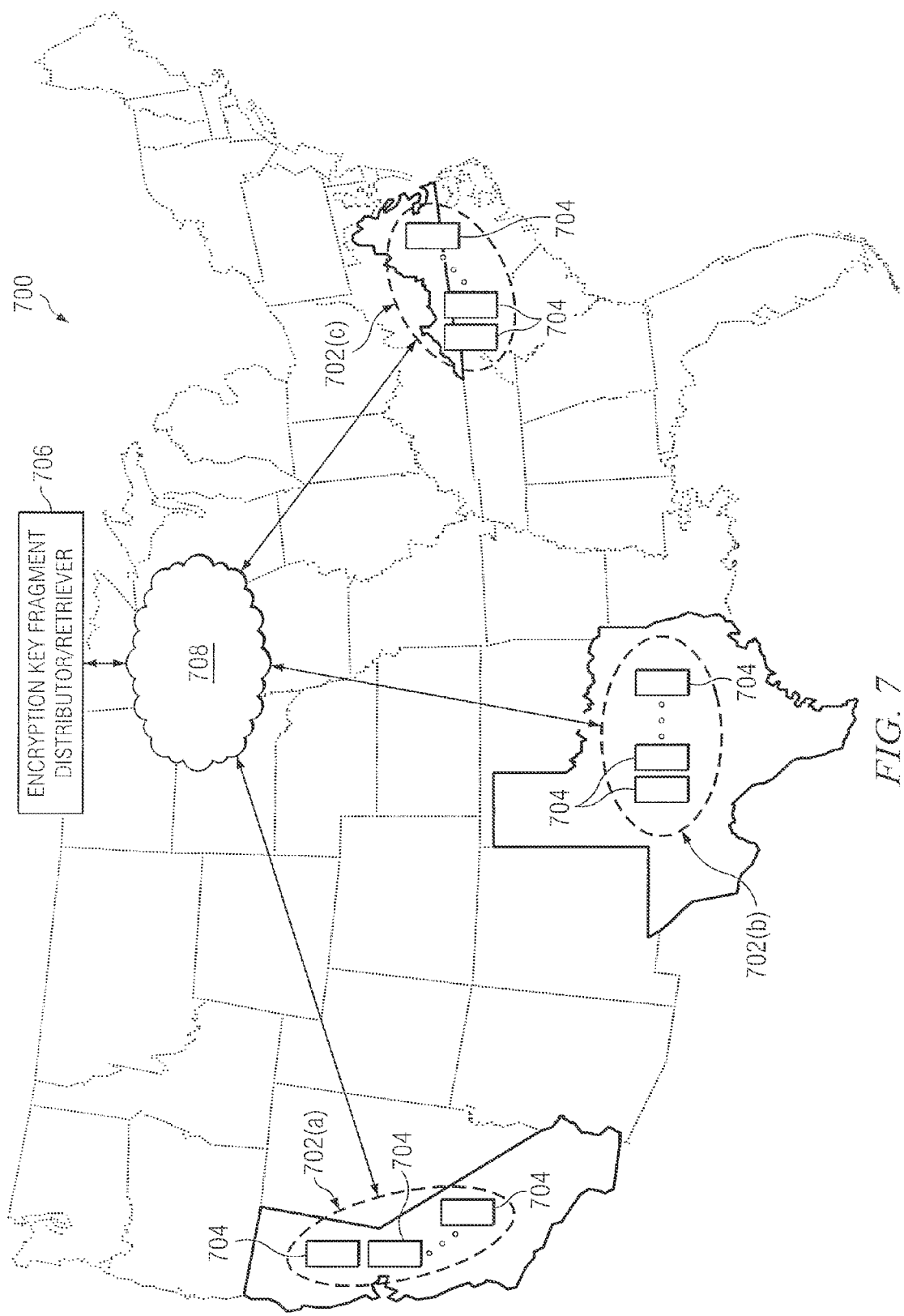
FIG. 7 is a schematic diagram of an encryption key storage system.

FIG. 7 is a schematic diagram of an encryption key storage system 700 in which encryption key fragment data stores are distributed across different geographic regions of the continental United States. Specifically, as illustrated in FIG. 7, the encryption key storage system 700 includes encryption key fragment stores that are distributed across California 702(a), Texas 702(b), and Virginia 702(c). Furthermore, as also illustrated in FIG. 7, multiple different availability zones 704 where encryption key fragment data stores are realized are located within each of geographic regions 702(a), 702(b), and 702(c). The encryption key storage system 700 includes an encryption key fragment distributor/retriever 706 that is communicatively connected to the data stores realized at the different availability zones 704 of the respective regions 702(a), 702(b), and 702(c) over a network 708. Network 708 may include the Internet, the World Wide Web, wide area networks (WANs), local area networks (LANs), analog or digital wired and wireless telephone networks, radio, television, cable, satellite, and/or any other delivery mechanisms for carrying data. Encryption key fragment distributor/retriever 706 is configured to distribute encryption key fragments for storage to data stores realized at different ones of the availability zones 704 in different ones of geographic regions 702(a), 702(b), and 702(c) and to retrieve encryption key fragments that have been so distributed so that their corresponding encryption keys can be reconstructed.

As described herein, encryption key fragment distributor/retriever 706 is configured to distribute encryption key fragments using placement techniques intended to facilitate timely retrieval of encryption key fragments for encryption key reconstruction while also providing protection against both data store-level failures and higher-level failures (e.g., region-level failures like natural disasters). For example, if an encryption key is fragmented into n encryption key fragments according to a scheme that enables the encryption key to be reconstructed from k<n fragments, at least k encryption key fragments may be distributed to each of geographic regions 702(a), 702(b), and 702(c). Consequently, if the encryption key fragments stored in one geographic region (e.g., California 702(a)) are unavailable for retrieval due to some sort of catastrophic failure like a natural disaster (e.g., an earthquake) impacting the data stores in the geographic region, it still may be possible for the encryption key storage system 700 to reconstruct the encryption key from the encryption key fragments stored in the data stores of one or more of the other geographic regions (e.g., Texas 702(b) and/or Virginia 702(c)).

Additionally, within any one of regions 702(a), 702(b), and 702(c), the constraint may be imposed that no more than k−1 encryption key fragments may be distributed for storage to data stores realized in any one availability zone 704. Consequently, even if the data stores realized in one availability zone are compromised, the integrity of the encryption key may be maintained due to the fact that the encryption key cannot be reconstructed from only k−1 encryption key fragments.

Although FIG. 7 illustrates the boundaries of geographic regions 702(a), 702(b), and 702(c) as being demarcated by the political boundaries of the states of California, Texas, and Virginia, the boundaries of a geographic region need not necessarily correspond to such politically-defined boundaries. Instead, the boundaries of a geographic region may be defined based on a level of network latency determined to be tolerable. For example, a tolerable level of network latency may be determined. Thereafter, a geographic region may be defined as an area of land occupied by a combination of interconnected computing devices for which the network latency between the computing devices across the area of land is less than or equal to the tolerable level of network latency. Thus, in the case of an encryption key store in which encryption key fragments are distributed across different data stores, a geographic region may be defined to include a combination of data stores for which the latency associated with retrieving encryption key fragments from the data stores is less than or equal to a tolerable latency. Additionally or alternatively, the boundaries of different geographic regions may be defined based on an evaluation of the chances that a catastrophic event (e.g., an earthquake or flood) may impact two regions simultaneously. For example, two or more different geographic regions may be identified and defined based on an assessment that the likelihood that a natural disaster could simultaneously impact any two or more of the geographic regions at the same time is below some threshold likelihood. In some implementations, distance between the boundaries of any two geographic regions may be used as a proxy for an evaluation of the chances that a catastrophic event may impact the two regions simultaneously. For example, two or more geographic regions may be identified and defined based on determining that the boundaries of any one geographic region are no closer than some minimum defined distance (e.g., 500 miles, 750 miles, 1000 miles, etc.) to the boundaries of any other geographic region.

An availability zone, meanwhile, may be a collection of computing devices within a geographic region that share a certain set of correlated failures. For example, an availability zone may be a collection of computing devices that are located in the same physical room and/or that are connected to the same electrical power source/outlet. Computing devices that do not share such correlated failures may be considered to be in different availability zones. For example, two computing devices that are electrically insulated from one another may not be considered to belong to the same availability zone. Different availability zones may also reside in different administrative domains. Doing so can extend the set of failures which can be tolerated to include accidental or intentional actions of administrators which may compromise the secrecy or availability of the data. In the case of data stores, two or more data stores that are realized on one or more computing devices that are located in the same physical room, that are connected to the same electrical power source/outlet, and/or are under the control of the same administrative domain may be considered to be data stores that are realized in the same availability zone. Distributing data, like encryption key fragments, across data stores realized in multiple different availability zones may help to prevent the failure or compromise of one or more availability zones from causing a loss or unauthorized exposure of the data.

Referring again to FIG. 7, the service that utilizes encryption key fragment distributor/retriever 706 to distribute encryption key fragments to different storage systems (as well as encryption key fragment distributor/retriever 706 itself) may be located within a particular one of geographic regions 702(a), 702(b), and 702(c). In such a case, the retrieval of encryption key fragments and the ultimate reconstruction of an encryption key may proceed more quickly for encryption key fragments stored in the geographic region within which the service and encryption key fragment distributor/retriever 706 are located than for encryption key fragments stored in the other geographic regions. Nevertheless, storing encryption key fragments in the other geographic regions may remain advantageous as doing so provides redundancy and backup in the event of a region-level failure.

For example, both a service that desires to have fragments of an encryption key distributed across multiple different data stores and encryption key fragment distributor/retriever 706 may be located within California 702(a). Therefore, the service may request that encryption key fragment distributor/retriever 706 distribute the encryption key fragments (as opposed to an encryption key fragment distributor/retriever located, for example, in Texas 702(b) or Virginia 702(c)). Encryption key fragment distributor/retriever 706 then may distribute a sufficient number of encryption key fragments from which to be able to reconstruct the encryption key across data stores realized at availability zones 704 within California 702(a). In addition, encryption key fragment distributor/retriever 706 also may distribute a sufficient number of encryption key fragments from which to be able to reconstruct the encryption key across data stores realized at availability zones 704 within one or both of Texas 702(b) and Virginia 702(c). In this scenario, when the service needs to reconstruct the encryption key, encryption key fragment distributor/retriever 706 may be able to retrieve a sufficient number of encryption key fragments from which to reconstruct the encryption key from the data stores realized at availability zones 704 within California 702(a) more quickly than from data stores realized at availability zones 704 within Texas 702(b) or Virginia 702(c). Nevertheless, storage of a sufficient number of encryption key fragments from which to reconstruct the encryption key in the data stores realized at availability zones within Texas 702(b) and Virginia 702(c) still may be beneficial, for example as backup in the event of a failure of one or more or all of the data stores realized at the availability zones located within California 702(a).

Figure 8:
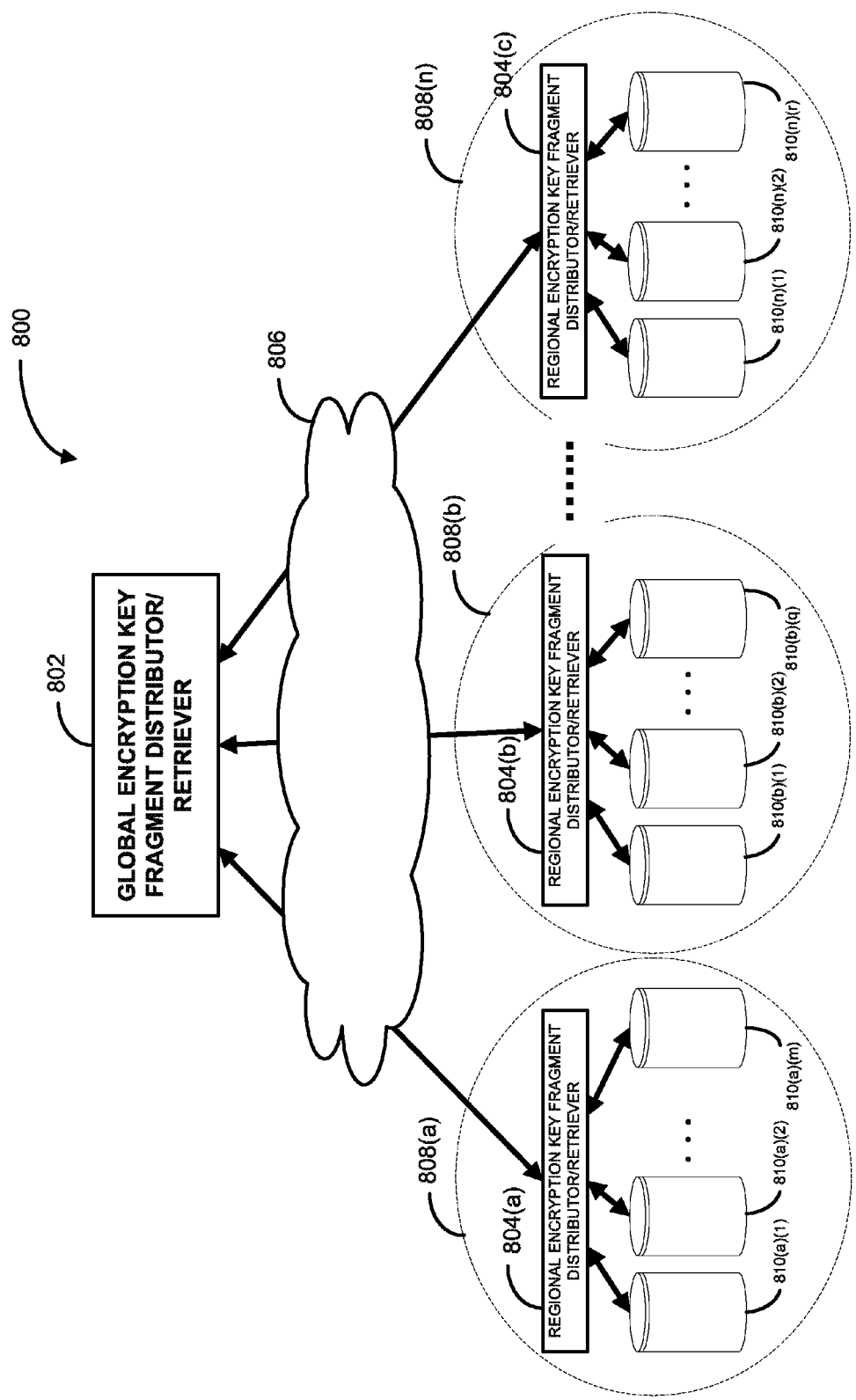
FIG. 8 is a block diagram of an encryption key storage system.

FIG. 8 is a block diagram of an encryption key storage system 800. As illustrated in FIG. 8, encryption key storage system 800 includes a global encryption key fragment distributor/retriever 802 that is communicatively coupled to multiple regional encryption key fragment distributors/retrievers 804(a)-804(n) via a network 806. Each regional encryption key fragment distributor/retriever 804 itself is located in or within a predetermined distance of a corresponding geographic region 808 and is communicatively coupled to data stores realized at a number of different availability zones 810 located in the geographic region 808 via a network (not shown).

Each of global encryption key fragment distributor/retriever 802 and regional encryption key fragment distributors/retrievers 804(a)-804(n) may be implemented as one or more computing devices (e.g., personal computers, general purpose computers, servers, mainframe computers, and/or combinations thereof) having internal or external storage components storing data and programs such as an operating system and one or more application programs. The one or more application programs may be implemented as instructions that are stored in the storage components and that, when executed, cause the one or more computing devices to provide functionality described herein. In addition, each computing device may include one or more processors for executing instructions stored in storage and/or received from one or more other electronic devices. Each computing device also may include one or more network interfaces and communication devices for sending and receiving data.

Global encryption key fragment distributor/retriever 802 and regional encryption key fragment distributors/retrievers 804(a)-804(n) collectively are configured to perform encryption key fragment distribution and retrieval techniques as described herein. In some implementations, an encryption key fragment distribution/retrieval application may be implemented as a set of computer-readable instructions distributed across encryption key fragment distributor/retriever 802 and regional encryption key fragment distributors/retrievers 804(a)-804(n) such that encryption key fragment distributors/retriever 802 and regional encryption key fragment distributors/retrievers 804(a)-804(n) collaborate to collectively perform encryption key fragment distribution and retrieval techniques as described herein. In some implementations, global encryption key fragment distributor/retriever 802 may perform the role(s) attributed herein to regional encryption key fragment distributor/retrievers 804(a)-804(n). In such implementations, the encryption key fragments may be directly distributed from global encryption key fragment distributor/retriever 802 to the data stores, without going through regional encryption key fragment distributor/retrievers 804(a)-804(n). This may reduce the end-to-end latency of distributing the encryption key fragments to their corresponding data stores.

The data stores realized at individual ones of availability zones 810 may be implemented by one or more computing devices sharing certain correlated features. For example, the data stores realized at individual ones of availability zones 810 may be realized by a duster of computing devices sharing a common electrical power source and/or that are housed within the same physical structure (e.g. room, building, container, etc.).

Examples of network 806 may include the Internet, the World Wide Web, wide area networks (WANs), local area networks (LANs), analog or digital wired and wireless telephone networks, radio, television, cable, satellite, and/or any other delivery mechanisms for carrying data.

Figure 9:
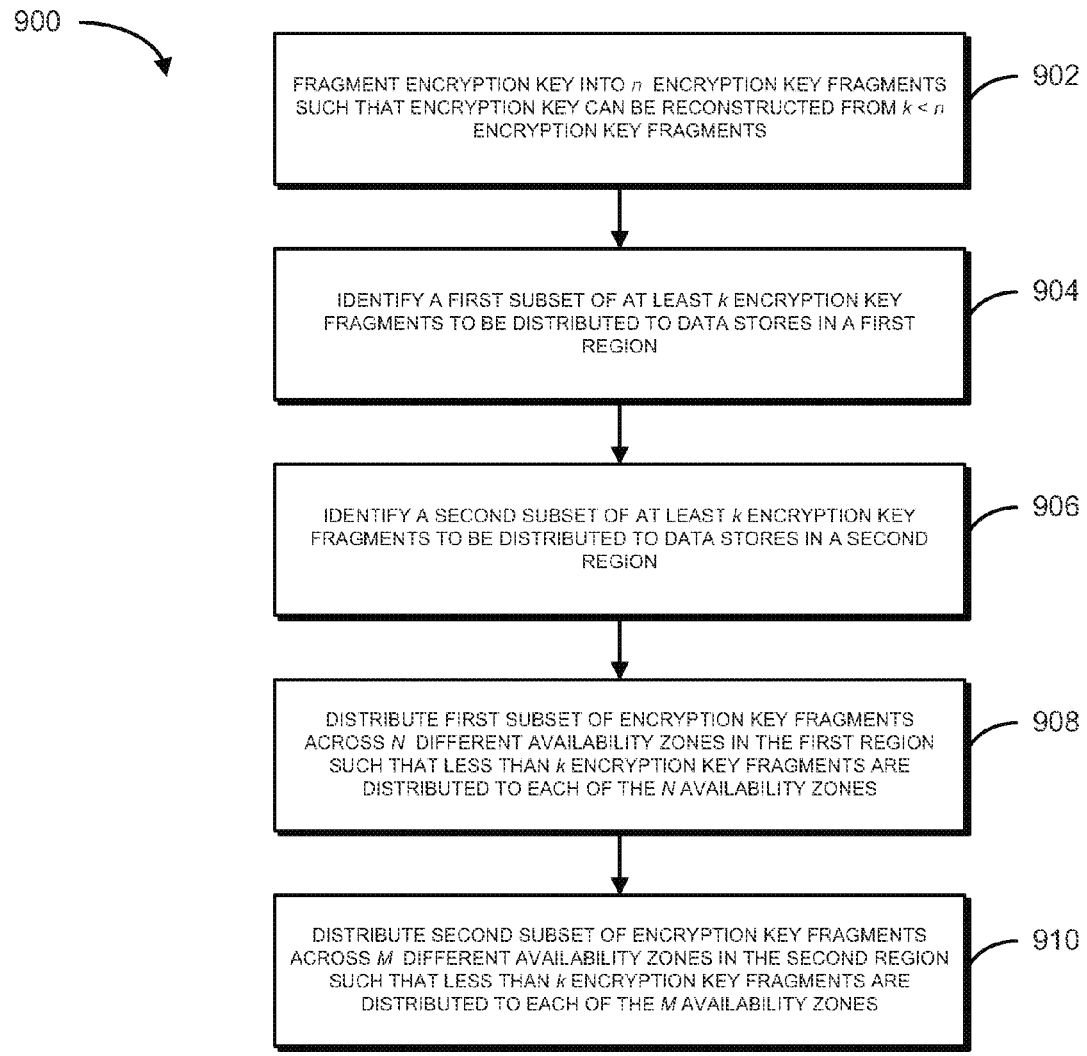
FIGS. 9-10 are flowcharts of examples of processes for distributing encryption key fragments.

FIG. 9 is a flowchart 900 of an example of a process for distributing fragments of an encryption key. The process illustrated in the flowchart 900 may be performed by one or more encryption key fragment distribution mechanisms such as, for example, encryption key fragment distributor/retriever 706 of FIG. 7, or global encryption key fragment distributor/retriever 802 and/or two or more of regional encryption key fragment distributor/retrievers 804(a)-804(n) of FIG. 8. More specifically, the process illustrated in the flowchart 900 of FIG. 9 may be performed by one or more processing elements of the computing device(s) that implement such encryption key fragment distribution mechanisms as a consequence of executing instructions stored on computer-readable storage media.

At 902, an encryption key is fragmented into n encryption key fragments according to a fragmentation scheme that enables the encryption key to be reconstructed from k<n encryption key fragments. At 904, a first subset of at least k of the encryption key fragments is identified for distribution to data stores in a first geographic region. Similarly, at 906, a second subset of at least k of the encryption key fragments is identified for distribution to data stores in a second geographic region. In some implementations the first and second subsets of encryption key fragments may be different and disjoint. In other implementations, the membership of the encryption key fragments in the first and second subsets may partially or completely overlap.

At 908, the first subset of encryption key fragments is distributed across data stores realized at N different availability zones in the first geographic region such that less than k encryption key fragments are distributed to any one of the N availability zones in the first geographic region. Similarly, at 910, the second subset of encryption key fragments is distributed across data stores realized at M different availability zones in the second geographic region such that less than k encryption key fragments are distributed to any one of the M availability zones in the second geographic region. As will be discussed in greater detail below, in some implementations, load balancing techniques may be employed such that the encryption key fragments of the first subset are distributed across the data stores realized at the N different availability zones in the first geographic region relatively uniformly and/or the encryption key fragments of the second subset are distributed across the data stores realized at the M different availability zones in the second geographic region relatively uniformly.

The encryption key fragment distribution may be viewed as a two-step process. First, sets of at least k of the encryption key fragments are distributed to each of at least two geographic regions. Then, at each geographic region, the individual encryption key fragments are distributed across different availability zones.

Different techniques may be employed to identify the sets of encryption key fragments to be distributed to each of the different geographic regions. For example, if the encryption key fragments are to be distributed across R different geographic regions and the encryption key has been fragmented into $n \geq kR$ encryption key fragments, the sets of encryption key fragments to be distributed to each of the R geographic regions may be determined as follows. The first k encryption key fragments $\{F_1, F_2, \ldots F_k\}$ may be identified for distribution to geographic region $R_1$, the second k encryption key fragments $\{F_{k+1}, F_{k+2}, \ldots F_{2k}\}$ may be identified for distribution to geographic region $R_2$, and so on and so forth with encryption key fragments $\{F_{kR-k+1}, R_{kR-k+2}, \ldots F_{kR}\}$ being distributed to geographic region $R_R$. Any remaining encryption key fragments then may be assigned serially across the geographic regions in a round robin fashion until all of the encryption key fragments have been assigned to a geographic region. For example, encryption key fragment $F_{kR+1}$ may be assigned to geographic region $R_1$ and encryption key fragment $F_{kR+2}$ may be assigned to geographic region $R_2$, and so on and so forth.

Much like the distribution of encryption key fragments to different geographic regions, different techniques may be used at the region-level to identify the encryption key fragments to be distributed to the data stores realized at the different availability zones within the particular geographic region. In some implementations, efforts may be made to balance the distribution of the encryption key fragments across the different availability zones and/or data stores realized at the different availability zones in a substantially uniform fashion.

Consider the case where, within a geographic region R, a set of M encryption key fragments $\{F_{R,1}, F_{R,2}, \ldots F_{R,M}\}$ are to be distributed across data stores realized at N different availability zones within the geographic region R and where only one data store is available at each of the N availability zones. The following discussion sets forth examples of encryption key fragment placement techniques for scenarios in which M=N, M<N, and M>N.

When M=N (i.e., the number of encryption key fragments to be distributed equals the number of data stores), the encryption key fragments ($F_{R,i}$) are assigned to data stores ($FS_i$) one by one $FS_i \leftarrow F_{R,i}$.

When M<N (i.e., the number of encryption key fragments to be distributed is less than the number of the data stores), the following placement scheme may be used to distribute the encryption key fragments. For each encryption key fragment, a random number generator that takes a seed value and the integer N as inputs and that produces a pseudorandom, uniformly distributed integer value p between 0 (inclusive) and N (exclusive) may be used to select a provisional placement for the encryption key fragment. In some implementations, the seed value for the random number generator may be generated by running a hashed message authentication code (HMAC) algorithm on the URI of the data object encrypted using the encryption key from which the encryption key fragments were derived. Based on the output p of the random number generator, the encryption key fragment provisionally is assigned to data store $FS_p$. However, before finalizing the assignment of the encryption key fragment to data store $FS_p$, data store $FS_p$ is checked to determine if one of the N encryption key fragments already is assigned to data store $FS_p$. If one of the N encryption key fragments is not already assigned to data store $FS_p$, the encryption key fragment is assigned to data store $FS_p$. In contrast, if one of the N encryption key fragments already is assigned to data store $FS_p$, the random number generator is used to generate another provisional assignment for the encryption key fragment, and the process repeats until a data store to which none of the N encryption key fragments has been assigned is selected. This placement technique is summarized in FIG. 10.

Figure 10:
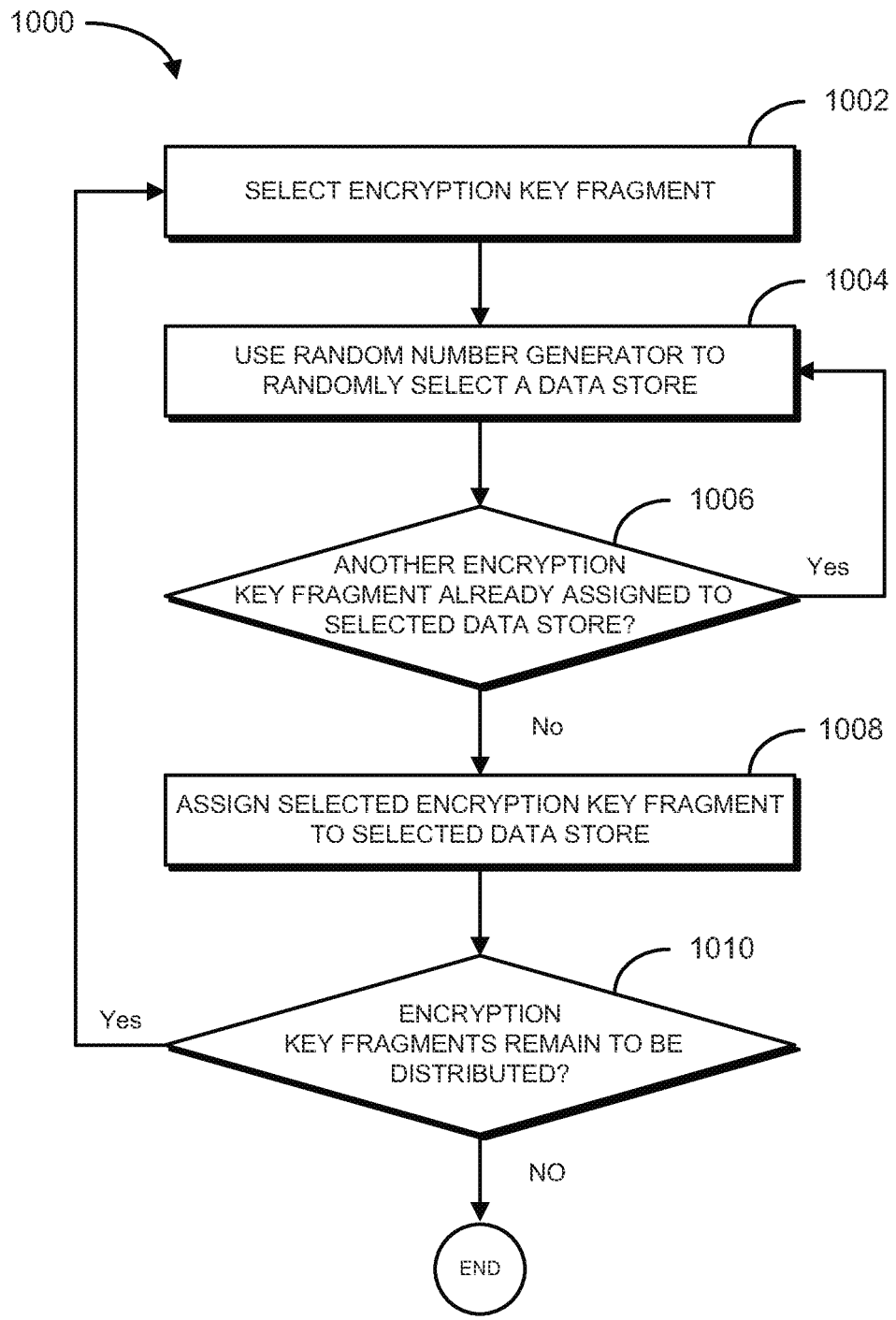

FIG. 10 is a flowchart 1000 of an example of a process for distributing fragments of an encryption key to data stores realized at different availability zones within a geographic region. The process illustrated in the flowchart 1000 may be performed by one or more encryption key fragment distribution mechanisms such as, for example, encryption key fragment distributor/retriever 706 of FIG. 7 or global encryption key fragment distributor/retriever 802 and/or one of regional encryption key fragment distributor/retrievers 804(a)-804(n) of FIG. 8. More specifically, the process illustrated in the flowchart 1000 of FIG. 10 may be performed by one or more processing elements of the computing device(s) that implement such encryption key fragment distribution mechanisms as a consequence of executing instructions stored on computer-readable storage media.

At 1002, an encryption key fragment is selected. A random number generator then is used to randomly select a data store to which to assign the encryption key fragment at 1004. Then, at 1006, a determination is made as to whether an encryption key fragment already has been assigned to the selected data store. If an encryption key fragment already has been assigned to the selected data store, the random generator is used select another data store. Otherwise, at 1008, the encryption key fragment is assigned to the selected data store and, at 1010, a determination is made as to whether any encryption key fragments remain to be distributed across the data stores realized at the different availability zones within the region. If one or more encryption key fragments remain to be distributed, the process is repeated and the next encryption key fragment is selected. Otherwise, the process ends.

in the case where M>N (i.e., the number of encryption key fragments to be distributed is more than the number of the data stores), the following placement scheme may be used to distribute the encryption key fragments. The first set of N encryption key fragments may be assigned to individual ones of the N fragment stores in sequence, one encryption key fragment to one data store. This same process may be repeated for each of the remaining sets of N encryption key fragments until the number of encryption key fragments left is less than N. The encryption key fragment scheme described above in connection with the scenario where M<N and summarized in FIG. 10 then may be used to determine assignments for each of the remaining encryption key fragments.

The placement techniques described above in connection with the scenarios where M=N, M<N, and M>N are deterministic. In other words, the placement scheme for an encryption key is determined by the URI of the data object that was encrypted using the encryption key. As a result, when the encryption key is to be retrieved from the encryption key store by presenting the same URI, the same placement algorithm can be used to reproduce the placement scheme for the fragments of the encryption key, thereby enabling the encryption key fragments to be retrieved from their designated data stores.

As described above, one constraint that may be imposed on encryption key fragment distribution when encryption key fragments are distributed across data stores in multiple different geographic regions is that no more than k-1 encryption key fragments may be distributed to any one availability zone in a geographic region. This constraint is intended to provide security in the event that an individual availability zone is compromised by a malicious intruder. As similarly described above, another constraint that may be imposed is that at least k encryption key fragments are distributed to data stores at each of at least two geographic regions to which encryption key fragments are distributed. This constraint is intended to improve availability in the event of a region-level failure.

Additional constraints can be imposed in an effort to improve availability even further. For example, a constraint may be imposed in order to be able to tolerate the failure of a predetermined number of availability zones in a given geographic region. In particular, suppose that the total number of encryption key fragments assigned to a region is T, that there are N availability zones in the region, that there is only a single data store available at each availability zone, and that the encryption key placement technique for distributing the T encryption key fragments across the N availability zones does so in a substantially uniform fashion. Then, on average, T/N encryption key fragments are stored in each availability zone. If X availability zones fail, the total retrievable encryption key fragments in the geographic region becomes $$\frac{T}{N} \cdot (N - X).$$

Thus, in order to reconstruct the encryption key from the encryption key fragments stored in the geographic region in the face of X availability zone failures, we need $$\frac{T}{N} \cdot (N - X) \geq k.$$

Therefore, in order to tolerate the failure of X availability zones in any given geographic region, the constraint may be imposed that the number of encryption key fragments T distributed to the geographic region be greater than or equal to $$\frac{k \cdot N}{N - X}.$$

Figure 11:
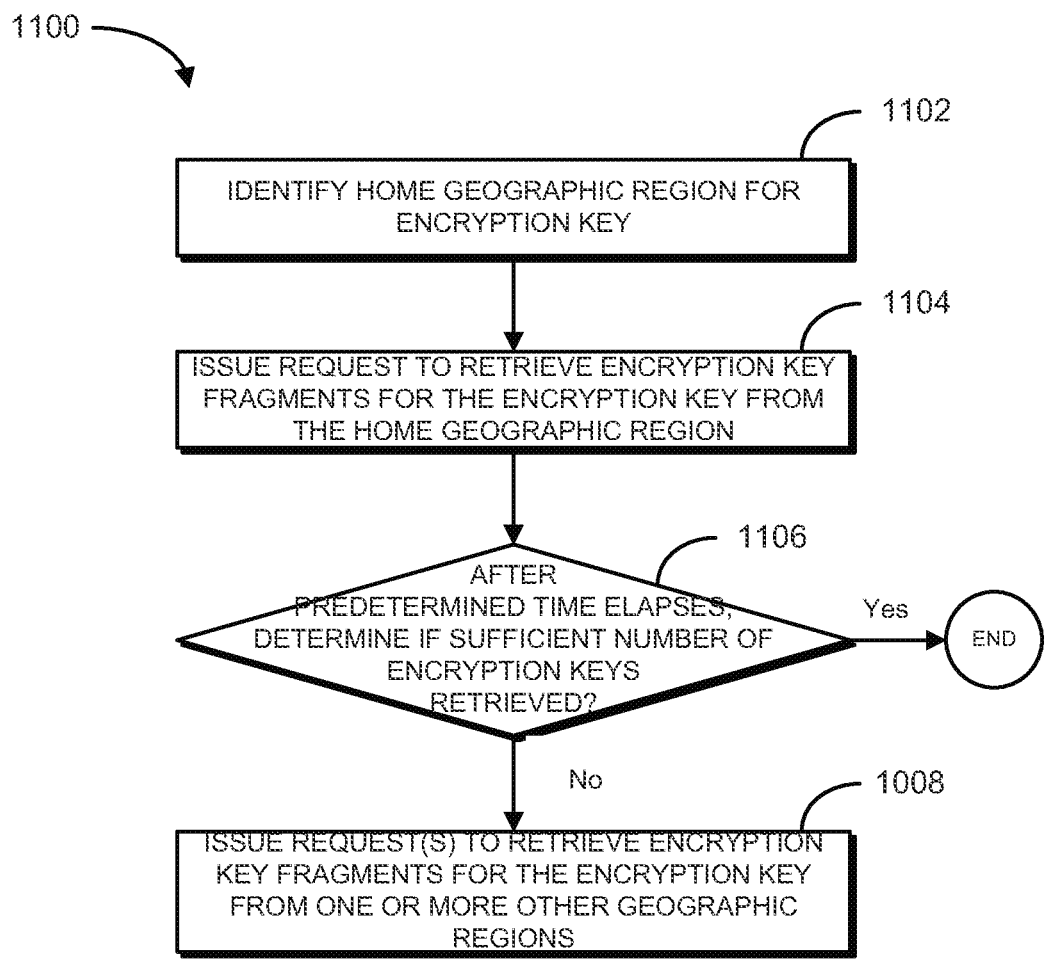
FIG. 11 is a flowchart of an example of a process for retrieving fragments of an encryption key.

FIG. 11 is a flowchart of an example of a process 1100 for retrieving fragments of an encryption key that have been distributed across data stores located in multiple different geographic regions. The process illustrated in the flowchart 1100 may be performed by one or more encryption key fragment retrieval mechanisms such as, for example, encryption key fragment distributor/retriever 706 of FIG. 7, or global encryption key fragment distributor/retriever 802 and/or two or more of regional encryption key fragment distributor/retrievers 804(a)-804(n) of FIG. 8. More specifically, the process illustrated in the flowchart 1100 of FIG. 11 may be performed by one or more processing elements of the computing device(s) that implement such encryption key fragment distribution mechanisms as a consequence of executing instructions stored on computer-readable storage media.

At 1102, a home geographic region for the encryption key is identified. For example, as described above, the service that used the encryption key to encrypt a data object may be located in or within a short distance of one of the geographic regions across which the encryption key store is implemented. In such cases, the geographic region in which the service is located or the geographic region that is closest to the service may be considered the home geographic region for the encryption key. After identifying the home geographic region of the encryption key, a request is issued, at 1104, to retrieve the encryption key fragments for the encryption key from the data stores realized at the availability zones located within the home geographic region for the encryption key. Due to the proximity of the home geographic region to the service, it may be possible to retrieve the encryption key fragments needed to reconstruct the encryption key from the data stores within the home geographic region more quickly than from one of the other geographic regions across which the encryption key fragments have been distributed.

After a predetermined period of time (e.g., the tolerable intra-region network latency used to determine the boundaries of the geographic region) has elapsed, a determination is made, at 1106, as to whether a sufficient number of the encryption key fragments have been retrieved in order to reconstruct the encryption key. If a sufficient number of encryption key fragments have been retrieved in order to reconstruct the encryption key fragment, the process may end. Otherwise, one or more requests may be issued to retrieve encryption key fragments for the encryption key from one or more other corresponding geographic regions.

Other processes also may be used to retrieve fragments of an encryption key that have been distributed across data stores located in multiple different geographic regions. For example, instead of first attempting to retrieve the fragments of the encryption key from a particular home geographic region before attempting to retrieve the fragments of the encryption key from all of the geographic regions across which the fragments of the encryption key were distributed, in some implementations, requests to retrieve the fragments of the encryption key may be made to all of the regions across which the fragments of the encryption key were distributed. Although this approach may increase the number of requests issued and responses received—and thus the corresponding network traffic—it also may reduce the time required to retrieve a sufficient number of the fragments of the encryption key in order to reconstruct the encryption key relative to the process summarized in FIG. 11 in the event of a region-level failure.

A number of methods, techniques, systems, and apparatuses have been described. The described methods, techniques, systems, and apparatuses may be implemented in digital electronic circuitry or computer hardware, for example, by executing instructions stored in a non-transitory computer-readable storage media.

Apparatuses implementing these techniques may include appropriate input and output devices, a computer processor, and/or a tangible computer-readable storage medium storing instructions for execution by a processor.

A process implementing techniques disclosed herein may be performed by a processor executing instructions stored on a tangible computer-readable storage medium for performing desired functions by operating on input data and generating appropriate output. Suitable processors include, by way of example, both general and special purpose microprocessors. Suitable computer-readable storage devices for storing executable instructions include all forms of non-volatile memory, including, by way of example, semiconductor memory devices, such as Erasable Programmable Read-Only Memory (EPROM), Electrically Erasable Programmable Read-Only Memory (EEPROM), and flash memory devices; magnetic disks such as fixed, floppy, and removable disks; other magnetic media including tape; and optical media such as Compact Discs (CDs) or Digital Video Disks (DVDs). Any of the foregoing may be supplemented by, or incorporated in, specially designed application-specific integrated circuits (ASICs).

Although the operations of the disclosed techniques may be described herein as being performed in a certain order, in some implementations, individual operations may be rearranged in a different order and/or eliminated and the desired results still may be achieved. Similarly, components in the disclosed systems may be combined in a different manner and/or replaced or supplemented by other components and the desired results still may be achieved.

What is claimed is:

1. A method for distributing encryption key fragments across data stores located within a first geographic region and data stores located within a second geographic region that is different than and physically separated from the first geographic region, the method comprising:

fragmenting, by a computer, an encryption key into a number, n, of encryption key fragments such that a number, k<n, of the encryption key fragments is sufficient for reconstructing the encryption key;

distributing, by the computer, a first subset of at least k of the encryption key fragments across data stores realized at N different availability zones within the first geographic region such that less than k of the encryption key fragments are distributed to each of the N availability zones within the first geographic region;

distributing, by the computer, a second subset of at least k of the encryption key fragments across data stores realized at M different availability zones within the second geographic region such that less than k of the encryption key fragments are distributed to each of the M availability zones within the second geographic region, wherein the encryption key fragments in the first subset have no overlap with the encryption key fragments in the second subset; and in response to determining that the computer is unable to obtain at least k of the encryption key fragments from the first geographic region, requesting encryption key fragments from the second geographic region for reconstructing the encryption key.

2. The method of claim 1 wherein:
distributing at least k of the encryption key fragments across the data stores realized at the N different availability zones within the first geographic region includes distributing encryption key fragments across the data stores realized at the N different availability zones such that at least k encryption key fragments collectively are distributed to the data stores realized at any combination of N-x availability zones within the first geographic region, where x is a predetermined number of availability zone failures within the first geographic region to be withstood; and
distributing at least k of the encryption key fragments across the data stores realized at the M different availability zones within the second geographic region includes distributing encryption key fragments across the data stores realized at the M different availability zones such that at least k encryption key fragments collectively are distributed to the data stores realized at any combination of M-y availability zones within the second geographic region, where y is a predetermined number of availability zone failures within the second geographic region to be withstood.

3. The method of claim 1 wherein:
fragmenting the encryption key into n encryption key fragments such that k of the encryption key fragments are sufficient for reconstructing the encryption key includes fragmenting the encryption key into n encryption key fragments such that $n \geq 2k$.

4. The method of claim 1 wherein:
distributing the first subset of at least k of the encryption key fragments across data stores realized at N different availability zones within the first geographic region includes distributing the first subset of at least k encryption key fragments across N data stores realized by N corresponding computing systems, each of the N computing systems being isolated from the other of the N computing systems; and
distributing the second subset of at least k of the encryption key fragments across data stores realized at M different availability zones within the second geographic region includes distributing the second subset of at least k encryption key fragments across M data stores realized by M corresponding computing systems, each of the M computing systems being isolated from the other of the M computing systems.

5. The method of claim 1 wherein:
distributing the first subset of at least k of the encryption key fragments across data stores realized at N different availability zones within the first geographic region includes balancing distribution of the at least k encryption key fragments in the first subset across the data stores realized at the N different availability zones; and
distributing the second subset of at least k of the encryption key fragments across data stores realized at M different availability zones within the second geographic region includes balancing distribution of the at least k encryption key fragments in the second subset across the data stores realized at the M different availability zones.

6. The method of claim 1 wherein:
distributing the first subset of at least k of the encryption key fragments across data stores realized at N different availability zones within the first geographic region includes, for each of multiple of the k encryption key fragments in the first subset:
deterministically identifying a particular data store realized at one of the N different availability zones within the first geographic region at which to store the encryption key fragment, and
distributing the encryption key fragment to the particular data store realized at one of the N different availability zones; and
distributing the second subset of at least k of the encryption key fragments across data stores realized at M different availability zones within the second geographic region includes, for each of multiple of the k encryption key fragments in the second subset:
deterministically identifying a particular data store realized at one of the M different availability zones within the second geographic region at which to store the encryption key fragment, and
distributing the encryption key fragment to the particular data store realized at one of the M different availability zones.

7. The method of claim 1 further comprising:
encrypting a data object using the encryption key; and
accessing an identifier associated with the encrypted data object, wherein:
distributing the first subset of at least k of the encryption key fragments across data stores realized at N different availability zones within the first geographic region includes:
accessing, for each of the data stores at the N different availability zones to which the at least k encryption key fragments in the first subset are to be distributed, an identifier for the data store,
performing, for each of the data stores at the N different availability zones to which the at least k encryption key fragments in the first subset are to be distributed, a hashing algorithm on a combination of the identifier associated with the encrypted data object and the identifier for the data store that yields a result, and
transmitting, to each of the data stores at the N different availability zones to which the at least k encryption key fragments in the first subset are to be distributed, a request to store one or more of the k encryption key fragments as well as the result of performing the hashing algorithm for the data store; and
distributing the second subset of at least k of the encryption key fragments across data stores realized at M different availability zones within the second geographic region includes:
accessing, for each of the data stores at the M different availability zones to which the at least k encryption key fragments in the second subset are to be distributed, an identifier for the data store,
performing, for each of the data stores at the M different availability zones to which the at least k encryption key fragments in the second subset are to be distributed, a hashing algorithm on a combination of the identifier associated with the encrypted data object and the identifier for the data store that yields a result, and
transmitting, to each of the data stores at the M different availability zones to which the at least k encryption key fragments in the second subset are to be distributed, a request to store one or more of the k encryption key fragments as well as the result of performing the hashing algorithm for the data store.

8. An encryption key fragment storage system comprising:
computer hardware systems implementing $N \geq 2$ different data stores at N corresponding different availability zones located within a first geographic region;
computer hardware systems implementing $M \geq 2$ different data stores at M corresponding different availability zones located within a second geographic region that is different from and physically separated from the first geographic region;
an encryption key fragment distributor to:
  access a number, n, of fragments of an encryption key, where a number, k<n, of the encryption key fragments is sufficient for reconstructing the encryption key;
  distribute a first subset of at least k of the encryption key fragments across the N data stores at the N availability zones within the first geographic region such that less than k of the encryption key fragments are distributed to each of the N availability zones within the first geographic region; and
  distribute a second subset of at least k of the encryption key fragments across the M data stores at the M availability zones within the second geographic region such that less than k of the encryption key fragments are distributed to each of the M availability zones within the second geographic region, wherein the encryption key fragments in the first subset have no overlap with the encryption key fragments in the second subset; and
an encryption key fragment retriever to:
  in response to determining that the encryption key fragment retriever is unable to obtain at least k of the encryption key fragments from the first geographic region, request encryption key fragments from the second geographic region for reconstructing the encryption key.

9. The system of claim 8 wherein:
the computer hardware systems implementing the N different data stores at the N availability zones located within the first geographic region are isolated from each other; and
the computer hardware systems implementing the M different data stores at the M availability zones located within the second geographic region are isolated from each other.

10. The system of claim 8 wherein the encryption key fragment distributor is further configured to:
balance distribution of the at least k encryption key fragments in the first subset across the N data stores at the N availability zones; and
balance distribution of the at least k encryption key fragments in the second subset across the M data stores at the M availability zones.

11. The system of claim 8 wherein:
the encryption key fragment distributor is configured to distribute at least k of the encryption key fragments in the first subset across the N data stores at the N different availability zones within the first geographic region by, for each of multiple of the k encryption key fragments in the first subset:
  deterministically identifying a particular data store at one of the N availability zones within the first geographic region at which to store the encryption key fragment, and
  distributing the encryption key fragment to the particular data store realized at one of the N different availability zones; and the encryption key fragment distributor is configured to distribute at least k of the encryption key fragments in the second subset across the M data stores at the M different availability zones within the second geographic region by, for each of multiple of the k encryption key fragments in the second subset:
  deterministically identifying a particular data store at one of the M availability zones within the second geographic region at which to store the encryption key fragment, and
  distributing the encryption key fragment to the particular data store realized at one of the M different availability zones.

12. A non-transitory computer-readable storage medium storing instructions that, when executed by a computing system, cause the computing system to:
access a number, n, of fragments of an encryption key where a number, k<n, of the encryption key fragments is sufficient for reconstructing the encryption key;
distribute a first set of at least k of the encryption key fragments across $N \geq 2$ different data stores realized at N corresponding different availability zones within a first geographic region such that no more than k−1 unique encryption key fragments are distributed to each of the availability zones within the first geographic region;
distribute a second set of at least k of the encryption key fragments across $M \geq 2$ different data stores realized at M corresponding different availability zones within a second geographic region that is different than and physically separated from the first geographic region such that no more than k−1 unique encryption key fragments are distributed to each of the availability zones within the second geographic region, wherein the encryption key fragments in the first set have no overlap with the encryption key fragments in the second set; and
in response to determining that the computing system is unable to obtain at least k of the encryption key fragments from the first geographic region, request encryption key fragments from the second geographic region for reconstructing the encryption key.

13. The computer readable storage medium of claim 12 wherein:
the N different availability zones within the first geographic region include N corresponding computing systems, each of the N computing systems being isolated from the other of the N computing systems; and
the M different availability zones within the second geographic region include M corresponding computing systems, each of the M computing systems being isolated from the other of the M computing systems.

14. The computer readable storage medium of claim 13 wherein:
distributing the first set of encryption key fragments across the N data stores realized at the N different availability zones within the first geographic region includes balancing distribution of the first set of encryption key fragments across the N data stores realized at the N different availability zones; and
distributing the second set of encryption key fragments across the M data stores realized at the M different availability zones within the second geographic region includes balancing distribution of the second set of encryption key fragments across the M data stores realized at the M different availability zones.

15. The computer readable storage medium of claim 12 wherein:
- distributing the first set of encryption key fragments across the N data stores realized at the N different availability zones within the first geographic region includes for each of multiple of the first set of encryption key fragments:
    - deterministically identify a particular data store realized at one of the N different availability zones within the first geographic region at which to store the encryption key fragment, and
    - distribute the encryption key fragment to the particular data store realized at one of the N different availability zones; and
- distributing the second set of encryption key fragments across the M data stores realized at the M different availability zones within the second geographic region includes for each of multiple of the second set of encryption key fragments:
    - deterministically identify a particular data store realized at one of the M different availability zones within the second geographic region at which to store the encryption key fragment, and
    - distribute the encryption key fragment to the particular data store realized at one of the M different availability zones.

* * * * *